US012145544B2

United States Patent
Cohrs et al.

(10) Patent No.: US 12,145,544 B2
(45) Date of Patent: *Nov. 19, 2024

(54) CLEANING DEVICE, SENSOR CLEANING MODULE, VEHICLE, AND METHOD FOR OPERATING A CLEANING DEVICE

(71) Applicant: ZF CV Systems Global GmbH, Bern (CH)

(72) Inventors: Jan Cohrs, Wietzendorf (DE); Jan Fiebrandt, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,994

(22) Filed: Dec. 7, 2022

(65) Prior Publication Data
US 2023/0107319 A1    Apr. 6, 2023

Related U.S. Application Data

(63) Continuation of application No. PCT/EP2021/068925, filed on Jul. 8, 2021.

(30) Foreign Application Priority Data

Jul. 23, 2020  (DE) .................... 10 2020 119 474.9
Aug. 10, 2020  (DE) .................... 10 2020 121 016.7

(51) Int. Cl.
*B60S 1/46*     (2006.01)
*B08B 3/02*     (2006.01)
(Continued)

(52) U.S. Cl.
CPC ........ *B60S 1/52* (2013.01); *B08B 3/02* (2013.01); *B08B 5/02* (2013.01); *B60S 1/481* (2013.01);
(Continued)

(58) Field of Classification Search
CPC .. B60S 1/0848; B60S 1/46; B60S 1/48; B60S 1/481; B60S 1/50; B60S 1/52; B60S 1/54;
(Continued)

(56) References Cited

U.S. PATENT DOCUMENTS 10,286,877 B2    5/2019  Lopez Galera et al.
2017/0168291 A1  6/2017  Buss
(Continued)

FOREIGN PATENT DOCUMENTS

DE    10 2015 121 434 A1    6/2017
DE    10 2018 126 090 A1    4/2020
(Continued)

OTHER PUBLICATIONS

English translation of the Written Opinion of the International Searching Authority dated Oct. 12, 2021 for international application PCT/EP2021/068925 on which this application is based.
(Continued)

*Primary Examiner* — David G Cormier
(74) *Attorney, Agent, or Firm* — Walter Ottesen, P.A.

(57) ABSTRACT

A cleaning device for a vehicle provides a liquid cleaning pulse and/or a compressed air cleaning pulse for a cleaning nozzle. The cleaning device includes a module compressed air connection for receiving compressed air and a pressure cylinder with a cylinder volume. A movable separator divides the cylinder volume into a compressed air receiving chamber and a cleaning liquid receiving chamber in a fluid tight manner. The air chamber has an air chamber connection which can be supplied with compressed air. Contraction of the liquid chamber occurs when filling the air chamber by moving the separator against a restoring force. A switching valve establishes a pneumatic connection between the module compressed air connection and the air chamber connec-
(Continued)

Figure 1:
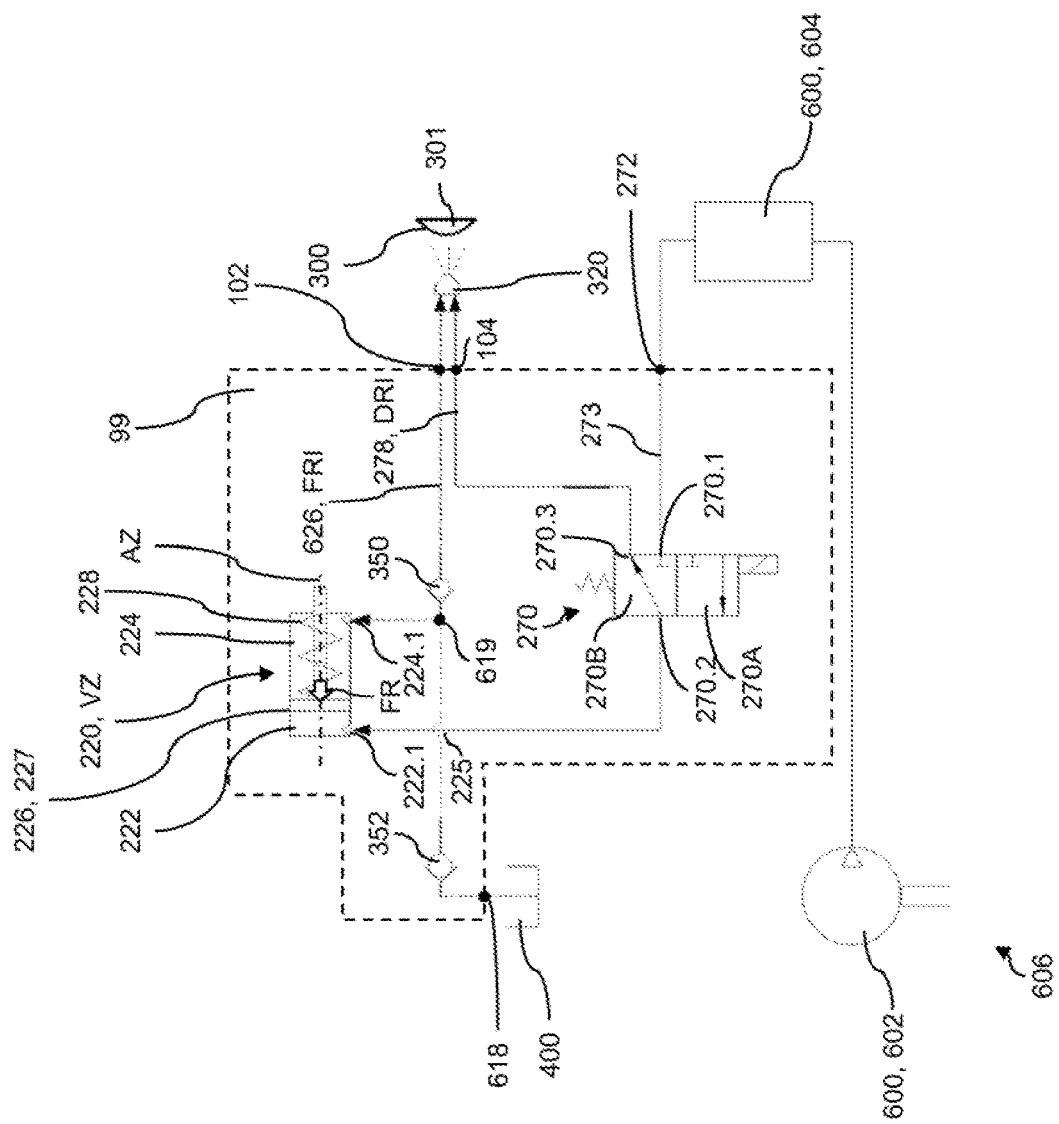

tion. A bypass valve establishes a pneumatic connection between the module compressed air connection and the compressed air nozzle line while bypassing the switching valve for providing a bypass compressed air flow.

17 Claims, 12 Drawing Sheets

(51) Int. Cl.
  *B08B 5/02* (2006.01)
  *B60S 1/48* (2006.01)
  *B60S 1/52* (2006.01)
  *B60S 1/54* (2006.01)
  *F16K 11/044* (2006.01)
  *F16K 27/02* (2006.01)
  *F16K 31/42* (2006.01)
  *G02B 27/00* (2006.01)
  *B60S 1/56* (2006.01)

(52) U.S. Cl.
  CPC ............... *B60S 1/54* (2013.01); *F16K 11/044* (2013.01); *F16K 27/02* (2013.01); *F16K 31/42* (2013.01); *G02B 27/0006* (2013.01); *B60S 1/56* (2013.01); *F16K 2200/501* (2021.08)

(58) Field of Classification Search
  CPC ..... B60S 1/56; B08B 3/02; B08B 5/02; B08B 7/04; B08B 2203/027; B08B 2205/00; G02B 27/0006

See application file for complete search history.

(56) References Cited

U.S. PATENT DOCUMENTS

| | | |
|---|---|---|
| 2018/0290631 A1 | 10/2018 | Rice et al. |
| 2020/0062222 A1* | 2/2020 | Fukazawa ................ B60S 1/50 |
| 2020/0130651 A1 | 4/2020 | Waible |
| 2021/0387596 A1 | 12/2021 | Fiebrandt et al. |
| 2022/0193734 A1 | 6/2022 | Cohrs et al. |

FOREIGN PATENT DOCUMENTS

| | | |
|---|---|---|
| DE | 10 2019 111 468 A1 | 11/2020 |
| EP | 3 168 094 A1 | 5/2017 |

OTHER PUBLICATIONS

International Search Report of the European Patent Office dated Oct. 12, 2021 for international application PCT/EP2021/068925 on which this application is based.

\* cited by examiner

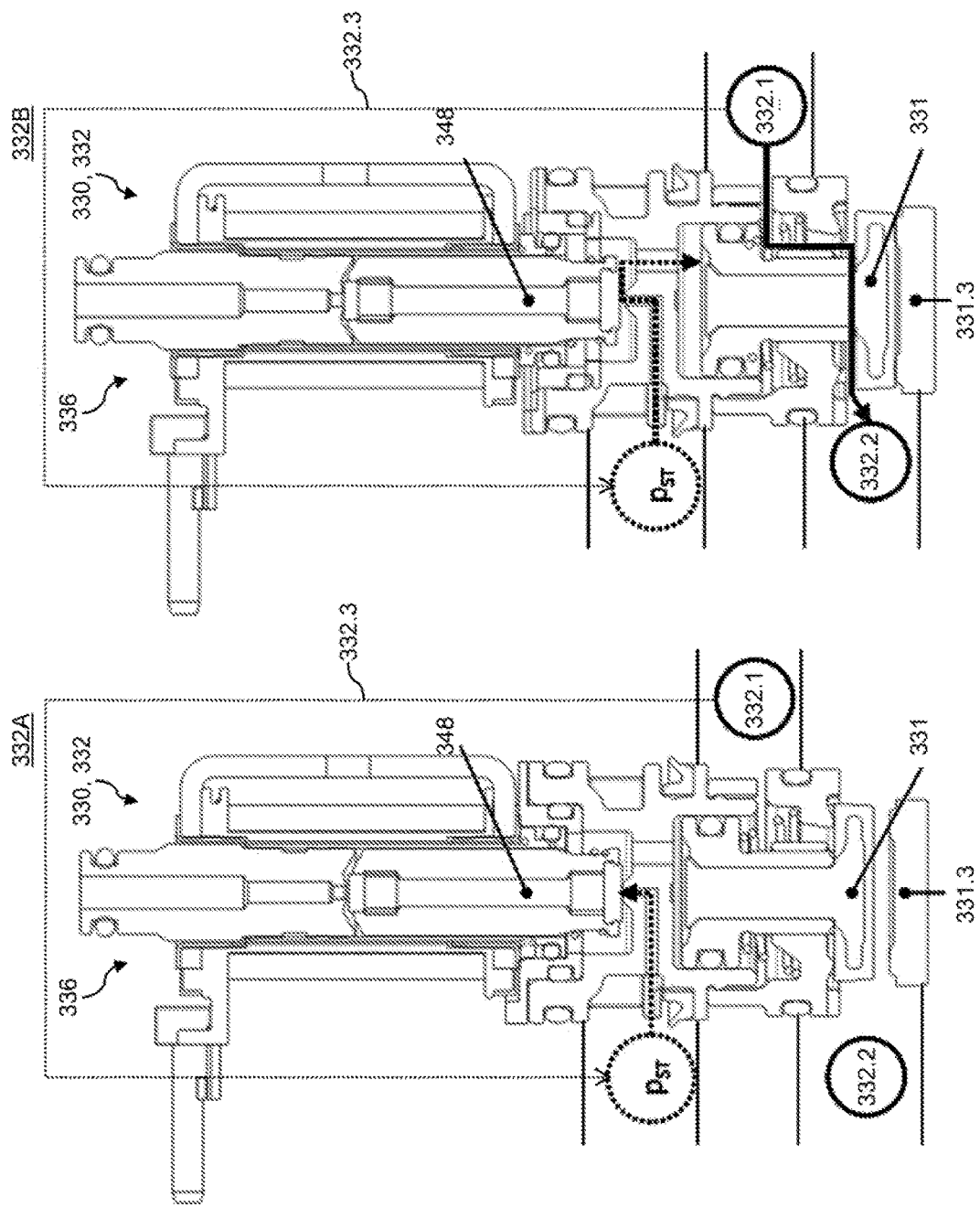

CLEANING DEVICE, SENSOR CLEANING MODULE, VEHICLE, AND METHOD FOR OPERATING A CLEANING DEVICE

CROSS-REFERENCE TO RELATED APPLICATIONS

This application is a continuation application of international patent application PCT/EP2021/068925, filed Jul. 8, 2021, which designates the United States and claims priority from German patent application 10 2020 119 474.9 filed Jul. 23, 2020, and German patent application 10 2020 121 016.7 filed Aug. 10, 2020. The present continuation application claims priority to each of the above applications and incorporates herein the entire contents thereof by reference.

TECHNICAL FIELD

The disclosure is directed to a cleaning device for providing a liquid cleaning pulse and/or a compressed air cleaning pulse. The disclosure is further directed to a sensor cleaning module, a vehicle and a method for operating a cleaning device.

BACKGROUND

Cleaning devices for vehicles for providing a liquid cleaning pulse and a compressed air cleaning pulse are generally known.

It has generally proved advantageous to provide in a cleaning device a pressure cylinder having both an air chamber and a liquid chamber in order to provide both a liquid cleaning pulse and a compressed air cleaning pulse with relatively little equipment cost, in particular with only one pressure source.

For example, EP 3 168 094 B1 describes a system for cleaning an external sensor surface mounted on the vehicle, having an air nozzle which is set up to output air to a sensor surface; an air pump which has a fluid inlet, an air outlet, an air-fluid interface and a variable volume compression chamber which communicates with the air outlet; with an air flow control device that communicates with the air nozzle and the air outlet to control the air flow thereof; and a liquid pump that communicates with the fluid inlet to provide a flow of pressurized liquid so that the volume of the compression chamber changes to produce a volume of compressed air with an absolute pressure below 10 bar.

However, such approaches are in need of further improvement, in particular with regard to the individual control of the cleaning pulse and in particular control of the compressed air cleaning pulse independent of a liquid cleaning pulse.

It is therefore desirable to improve the function of the cleaning device with regard to the controllability, in particular the controllability of the cleaning pulse, and at the same time to keep the equipment cost for this as low as possible.

SUMMARY

It is an object of the disclosure to provide an improved cleaning device with which in particular the possibility of controlling individual cleaning pulses is improved.

The disclosure is based on a cleaning device for a vehicle for providing a liquid cleaning pulse for at least one cleaning nozzle. The cleaning device includes:
- a module compressed air connection for receiving compressed air,
- a pressure cylinder with a cylinder volume, having a movable separating arrangement that divides the cylinder volume in a fluid-tight manner into a compressed air receiving air chamber and a cleaning liquid receiving liquid chamber, wherein
- the air chamber has an air chamber connection which can be provided with compressed air for filling the air chamber, wherein contraction of the liquid chamber takes place when filling the air chamber by moving the separating arrangement against a restoring force and expanding the air chamber, whereby cleaning liquid in the form of the liquid cleaning pulse is provided to a liquid nozzle line via a liquid chamber connection of the liquid chamber.

According to the disclosure, a switching valve is provided with the cleaning device, which is configured for establishing a pneumatic connection between the module compressed air connection and the air chamber connection in a ventilation position.

According to the disclosure, a bypass valve is also provided with the cleaning device, which is configured for establishing a pneumatic connection between the module compressed air connection and the compressed air nozzle line while bypassing the switching valve in an open position for providing a bypass compressed air flow.

The disclosure is based on the consideration that a pressure cylinder can basically be advantageously used in a cleaning device to generate both a liquid cleaning pulse and a compressed air cleaning pulse with relatively little equipment cost, in particular with only one pressure source. This is achieved in particular with a movable separating arrangement arranged within the pressure cylinder, which divides the cylinder volume into an air chamber and a liquid chamber, each with variable volume, and thereby separates the two chambers from each other in a sealed manner. Due to this separating arrangement, a pressure transfer between the compressed air and the cleaning liquid is possible, whereby a compressed air source, in particular a liquid pump for the cleaning liquid, can be saved, because the pressurization of the cleaning liquid can be carried out via the compressed air source.

In US 2022/0193734 A1, incorporated herein by reference, a cleaning device of the aforementioned type for subjecting a surface to a medium pulse, in particular a surface of a sensor, preferably an optical sensor, in particular an environmental detection sensor, is described in principle. The cleaning device has:
- a pressure cylinder, with a pressure connection, a medium connection and a first nozzle connection, wherein
- in the pressure cylinder a separating and displacement means with a first and/or second pressure transmitter surface is arranged for dividing the volume of the pressure cylinder into a first medium chamber and a second medium chamber and for changing a volume of the first and second medium chambers.

The cleaning device basically also has a switching valve of the aforementioned type; namely a switching valve that has a first pressure cylinder connection, a first medium source connection and a second nozzle connection and that is configured to switch to a first switching state and a second switching state, wherein
- in the first switching state, the first medium chamber can be connected to the first medium source connection via the pressure connection to reduce the volume of the second medium chamber, and in the second switching state, the first medium chamber can be connected to the second nozzle connection via the pressure connection to increase the volume of the second medium chamber, in such a way that the surface can be subjected to
a medium pulse of a liquid medium, and/or
a medium pulse of a gaseous medium.

The disclosure also includes the knowledge that a possibility of control of an additional bypass compressed air flow independently of the pressure cylinder makes sense. The bypass valve provides in particular the bypass compressed air flow to the compressed air nozzle line and/or the nozzle compressed air connection. The bypass valve is configured in particular for separating the pneumatic connection between the module compressed air connection and the compressed air nozzle line in a closed position.

In contrast to generating a compressed air cleaning pulse with the pressure cylinder, which always requires prior application of a liquid cleaning pulse by the separating arrangement, a compressed air flow can be provided via a bypass valve independently of the pressure cylinder—and in particular, any number of times (in particular to apply compressed air to a sensor surface any number of times). By providing a compressed air flow independently of the pressure cylinder, the cleaning device can be operated in an advantageous liquid-saving manner, especially in cases where no cleaning liquid is required—for example when it is raining. Also, in such a case, the pressure cylinder is advantageously not mechanically loaded unnecessarily. Finally, a bypass valve according to the disclosure enables a direct or more direct pneumatic connection of the cleaning nozzle to the module compressed air connection, whereby advantageously a higher pressure of the compressed air provided for the cleaning nozzle, in particular the bypass compressed air flow, can be achieved, in particular compared to a compressed air cleaning pulse which is generated via the separating arrangement—which has been moved back by the restoring force.

The cleaning device is particularly configured for the direct or indirect connection of a cleaning nozzle for subjecting a sensor surface to the liquid cleaning pulse and/or the compressed air cleaning pulse.

The switching valve is configured in particular for disconnecting the pneumatic connection between the module compressed air connection and the air chamber connection in a venting position. The switching valve is particularly configured for establishing a pneumatic connection between the air chamber connection and a compressed air nozzle line for providing the compressed air cleaning pulse by moving the separating arrangement back via the restoring force into a venting position, for providing a compressed air cleaning pulse to the compressed air nozzle line.

In the context of an embodiment, it is provided that the bypass valve is in the form of a 2/2-way valve, in particular a 2/2-way solenoid valve and/or a cartridge valve. The 2/2-way valve is preferably in the form of a normally closed valve. "Normally closed valve" means that the 2/2-way valve is in its closed position in the non-controlled, in particular deenergized, state.

In the context of an embodiment, it is provided that the bypass valve is formed as an arrangement of a 3/2-way valve and a quick exhaust valve, wherein the 3/2-way valve is configured for establishing a pneumatic connection between the module compressed air connection and the quick exhaust valve in an open position, and for establishing a pneumatic connection between the quick exhaust valve and a venting connection of the 3/2-way valve in a closed position, the quick exhaust valve is arranged between the bypass valve and the compressed air nozzle line or in a compressed air nozzle connection line and is configured for receiving the bypass compressed air flow and providing a bypass compressed air cleaning pulse. In particular, the quick exhaust valve is arranged between the bypass valve and the compressed air nozzle line. In such an embodiment, the bypass valve is configured to provide the bypass compressed air cleaning pulse when the 3/2-way valve is in the closed position. The quick exhaust valve has in particular a compressed air buffer. The 3/2-way valve is preferably in the form of a normally open valve. 'Normally open valve' means that the 3/2-way valve is in its open position in the non-controlled, in particular deenergized, state, and is only switched to its closed position—venting the quick exhaust valve at its second connection for outputting the bypass compressed air cleaning pulse—if a bypass compressed air cleaning pulse is to be provided. In particular, the quick exhaust valve is arranged between the bypass valve and the cleaning nozzle.

Via a quick exhaust valve, a bypass compressed air cleaning pulse can be advantageously generated for application to the sensor surface, which advantageously has a higher pressure and/or an improved cleaning performance, in particular compared to a continuous flow, for example a bypass compressed air flow. The venting connection is configured in particular for venting into the environment, in particular via a suitable outlet. In embodiments in which the quick exhaust valve is arranged as close as possible to the cleaning nozzle—in particular in the compressed air nozzle connection line or in the compressed air nozzle line near the compressed air nozzle connection—a low pressure loss and high pressure of the bypass compressed air cleaning pulse can be advantageously achieved.

The 3/2-way valve may be in the form in particular of a cartridge valve, wherein in particular a connection arranged on the valve seat of the cartridge valve is used as a venting connection. A 2/2-way valve or 3/2-way valve in the form of a cartridge valve can be advantageously integrated into a housing in the form of a valve cartridge housing of a cleaning device in the form of a sensor cleaning module. A cartridge valve is a pneumatic or hydraulic valve with standardized dimensions, in particular a standardized diameter, and is of essentially cylindrical form, which fits into a likewise standardized valve insert of a valve cartridge housing. A cartridge valve can be replaced in a particularly simplified way, in particular for maintenance and/or repair.

In the context of an embodiment, it is provided that the switching valve and the bypass valve are formed together as a combination valve, wherein the combination valve is in the form of a 3/3-way valve. The 3/3-way valve may, in particular in addition to the ventilation position and the venting position of the switching valve, have a bypass position as a third switching position, in which the module compressed air connection is pneumatically connected to the compressed air nozzle line, whereby the bypass position essentially performs the function of the bypass valve. Via a 3/3-way valve, a compact configuration of the cleaning device can be advantageously achieved.

As part of a development, it is envisaged that the bypass line and the compressed air nozzle line are jointly formed as a line that pneumatically connects the bypass valve to the compressed air nozzle connection. In such a development, in particular, the third connection of the switching valve is not connected to the compressed air nozzle line but is configured for venting directly into the environment in the venting position.

In the context of an embodiment, a module accumulator for storing cleaning liquid, and/or a module control unit, configured for controlling the switching valve and/or the bypass valve, and/or a module compressed air accumulator, configured for storing compressed air, is provided. Via a module accumulator, the dependence on liquid sources can be advantageously reduced, because a supply of cleaning liquid can be stored locally in the cleaning device. Via a module compressed air accumulator, the dependence on compressed air sources can be reduced in an analogous manner. A module control unit advantageously enables communication, in particular exchanging signals, with a vehicle control unit and/or other module control units of further cleaning devices arranged in the vehicle.

In the context of an embodiment, a nozzle line combination is provided, which is configured to connect the liquid nozzle line and the compressed air nozzle line fluidically to a combination nozzle line. In particular, a combination nozzle connection fluidically connected to the combination nozzle line is provided, via which one or more cleaning nozzles can be connected to the cleaning device. By a combination nozzle line and/or a combination nozzle connection, the equipment cost for connecting a cleaning nozzle to the cleaning device or to the sensor cleaning module can be advantageously reduced, in particular the number of lines can be reduced. A combination nozzle line is in the form in particular of a single line through which compressed air and cleaning liquid can be passed one after the other or simultaneously. In embodiments with a combination nozzle line, a respective non-return valve can be provided in the liquid nozzle line and in the compressed air nozzle line to prevent compressed air from entering the liquid nozzle line and cleaning liquid from entering the compressed air nozzle line. In embodiments with one or more nozzle valves for the selective activation and deactivation of individual cleaning nozzles, a simple nozzle valve, in particular a 2/2-way valve, can be advantageously used with a combination nozzle line, because only one line must be switched.

In the context of an embodiment, a nozzle line distribution point is provided, which is configured to divide the combination nozzle line and/or the liquid nozzle line and/or the compressed air nozzle line into multiple nozzle branch lines. The multiple nozzle branch lines are fluidically connected in particular to the divided nozzle line. Via a number of nozzle branch lines, multiple cleaning nozzles can be advantageously connected to a cleaning device and/or a sensor cleaning module, and in this way in particular installation space in the vehicle can be saved.

In the context of an embodiment, a nozzle valve arranged in a combination nozzle line and/or the nozzle branch line is provided. Via a nozzle valve, a cleaning nozzle can be advantageously controlled independently of one or more other cleaning nozzles, in particular even if these one or more other cleaning nozzles are supplied by the same cleaning device.

In the context of an embodiment, it is provided that the sensor cleaning module has at least one cleaning nozzle, provided for subjecting a sensor surface to the liquid cleaning pulse and/or the compressed air cleaning pulse, wherein the cleaning nozzle is fluidically connected to the compressed air nozzle line and/or the liquid nozzle line and/or the combination nozzle line and/or the nozzle branch line. In an embodiment in which the cleaning nozzle is integrated into the cleaning device and/or the sensor cleaning module, a compact and/or installation space-saving configuration is advantageously achieved. In further embodiments, a distance between the sensor cleaning module and the at least one cleaning nozzle is advantageously bridged with a nozzle connection line, which is configured to fluidically and/or air-conductively connect the cleaning nozzle to a nozzle liquid connection and/or a nozzle compressed air connection and/or a nozzle combination connection of the sensor cleaning module. In general, it is advantageous to keep the line length of a nozzle connection line as short as possible with regard to the lowest possible pressure losses and thus to the strongest possible compressed air and/or liquid cleaning pulses.

In the context of an embodiment, it is provided that the separating arrangement is a cylinder plunger axially movable along a cylinder axis and in sealing contact with a cylinder inner wall of the pressure cylinder, wherein the cylinder plunger is held with a return spring for generating the restoring force in the pressure cylinder. A cylinder plunger provides a reliable and cost-effective way of realizing the configuration of a separating arrangement. Nevertheless, other types of separating arrangement, such as flexible membranes, are possible. Also, via a cylinder plunger advantageously high pressures can be achieved, in particular a high pressure of the cleaning liquid and the liquid cleaning pulse. A constant consumption of cleaning media, in particular the cleaning liquid, is also achieved via a cylinder plunger. The pressure of the liquid cleaning pulse can be determined essentially directly via a cylinder plunger via the inlet pressure of the system, that is, the air pressure with which the air chamber connection is pressurized. If the air chamber connection is pressurized with a higher pressure, a correspondingly greater force acts against the cylinder plunger and the retaining spring. This then results in a higher pressure of the liquid cleaning pulse.

In the context of an embodiment, the cleaning device may have, in particular in the air chamber line, a controllable pressure control valve, in particular an electronically controllable pressure control valve, in order to selectively control the pressure to which the air chamber connection is subjected in this way, and in particular also the pressure of the liquid cleaning pulse.

In the context of an embodiment, a module control unit is provided, which is configured for controlling the valves of the cleaning device, in particular the switching valve and/or the bypass valve and/or the nozzle valve, and/or is configured for communication between the cleaning device and a vehicle control unit of the vehicle, in particular via a vehicle bus. The vehicle bus can be in the form in particular of a CAN bus. The module control unit may be configured for translating bidirectionally between control signals of the vehicle control unit and switching signals of the valves of the cleaning device and thus advantageously to serve as a technical control interface between a vehicle control unit of the vehicle and the cleaning device.

In a second aspect the disclosure implements a sensor cleaning module having a module housing, in particular a valve cartridge housing, and a cleaning device according to the first aspect of the disclosure. In a sensor cleaning module according to the second aspect, the advantages of the cleaning device according to the first aspect of the disclosure are advantageously used. By integrating the cleaning device into the module housing, a compact and protected configuration of the cleaning device is achieved. In developments in which the module housing is formed as a valve cartridge housing, the sensor cleaning module can be advantageously accommodated in a standard component. A valve cartridge housing is formed in particular as a block made of aluminum or plastic or a similar suitable material in which a number of valve inserts is introduced by suitable processing methods with corresponding holes or similar and/or fluid-carrying lines between the valve inserts and/or external connections. A module accumulator may be arranged in particular in the valve cartridge housing or attached to it.

A third aspect of the disclosure concerns a vehicle, in particular a car or a commercial vehicle, having at least one cleaning device according to the first aspect of the disclosure or a sensor cleaning module according to the second aspect of the disclosure.

The disclosure for a fourth aspect concerns a method for operating a cleaning device according to the first aspect of the disclosure or a sensor cleaning module according to the second aspect of the disclosure, characterized by the cleaning steps:
  switching the switching valve into a ventilation position for pressurizing the air chamber connection for providing the liquid cleaning pulse to the liquid nozzle line,
  switching the switching valve into a venting position for venting the air chamber connection, thereby
  moving the separating arrangement back via the restoring force for providing the compressed air cleaning pulse to the compressed air nozzle line and for refilling the liquid chamber with cleaning liquid.

In a development of the method, the following steps are provided:
  checking on the basis of a cleaning check signal of the sensor whether cleaning of the sensor surface has taken place, in particular whether a liquid cleaning pulse has been delivered to the sensor surface,
  providing a negative cleaning check signal if cleaning of the sensor surface has not taken place, especially if no liquid cleaning pulse has been delivered to the sensor surface, and
  repeating the cleaning steps one or more times if the cleaning check signal is negative. In the case of a single repetition, the cleaning check signal is checked in particular after each pass of the cleaning steps described above. In the case of multiple repetitions, a fixed number of passes of the cleaning steps described above, in particular five or ten passes, is carried out before the cleaning check signal is checked. Checking whether the sensor surface has been cleaned can be carried out in particular on the basis of an evaluation of the signal quality of the sensor signal, in particular on the basis of a comparison with a reference signal, for example a reference camera image.

In a development of the method, the following steps are provided:
  switching the bypass valve to an open position for generating a bypass compressed air flow,
  switching the bypass valve into a closed position, in particular switching the bypass valve in the form of a 3/2-way valve into a closed position for generating a bypass compressed air cleaning pulse.

When switching the bypass valve into a closed position, pulse-like venting towards the compressed air nozzle line is carried out to provide the bypass compressed air cleaning pulse in embodiments with a quick exhaust valve, wherein the quick exhaust valve, in particular a compressed air buffer of the quick exhaust valve, was previously charged with compressed air by the bypass compressed air flow in the open position of the bypass valve, in particular the 3/2-way valve.

A method for operating the cleaning device may be controlled in particular by a module control unit of the cleaning device or by a vehicle control unit of the vehicle, or by a combination of the two.

Embodiments of the disclosure are now described below on the basis of the drawing. This is not necessarily intended to represent the embodiments to scale, but rather the drawing is executed in schematized form where this is useful for explanation.

BRIE DESCRIPTION OF DRAWINGS

Figure 2:
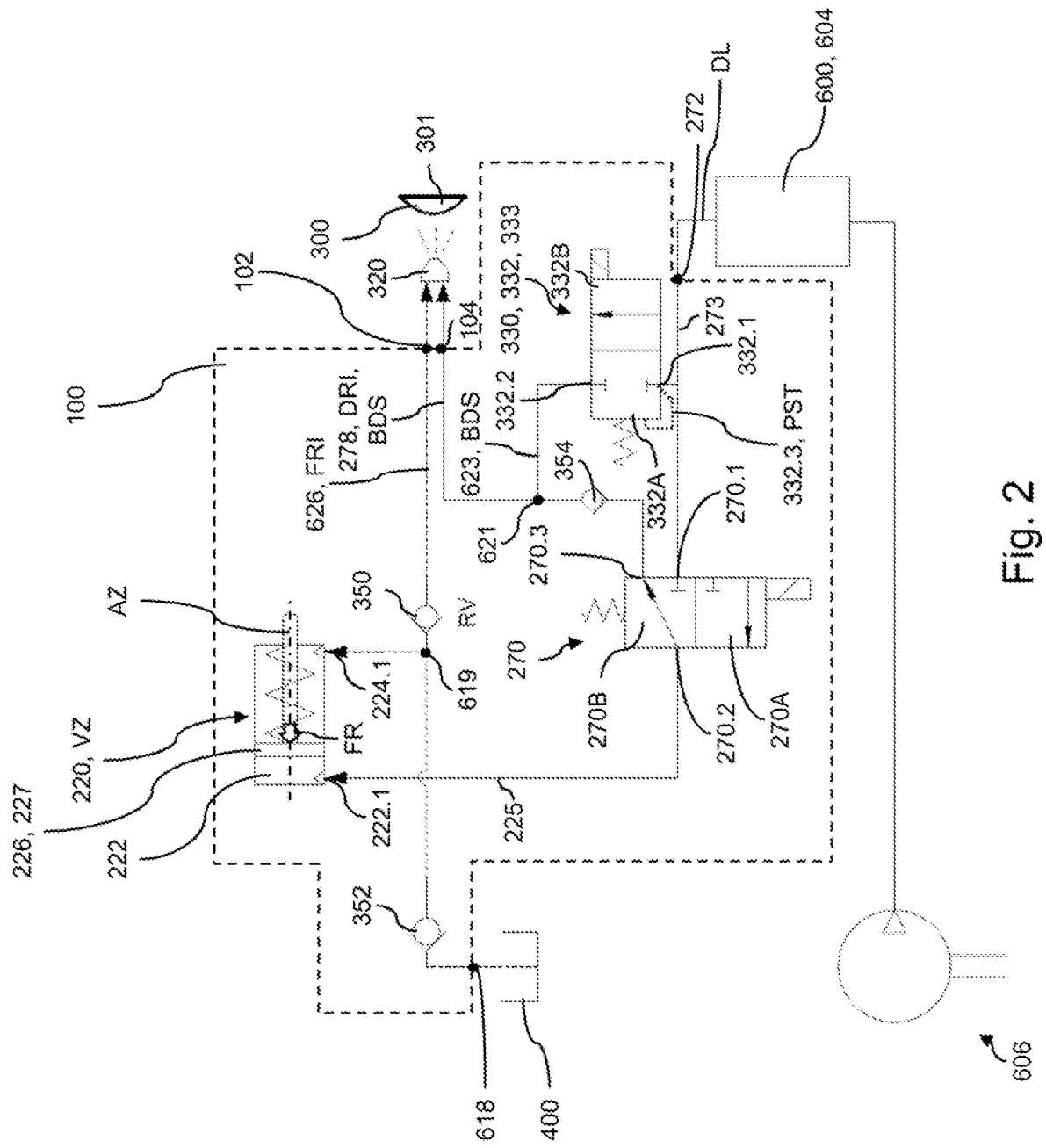
Figure 3:
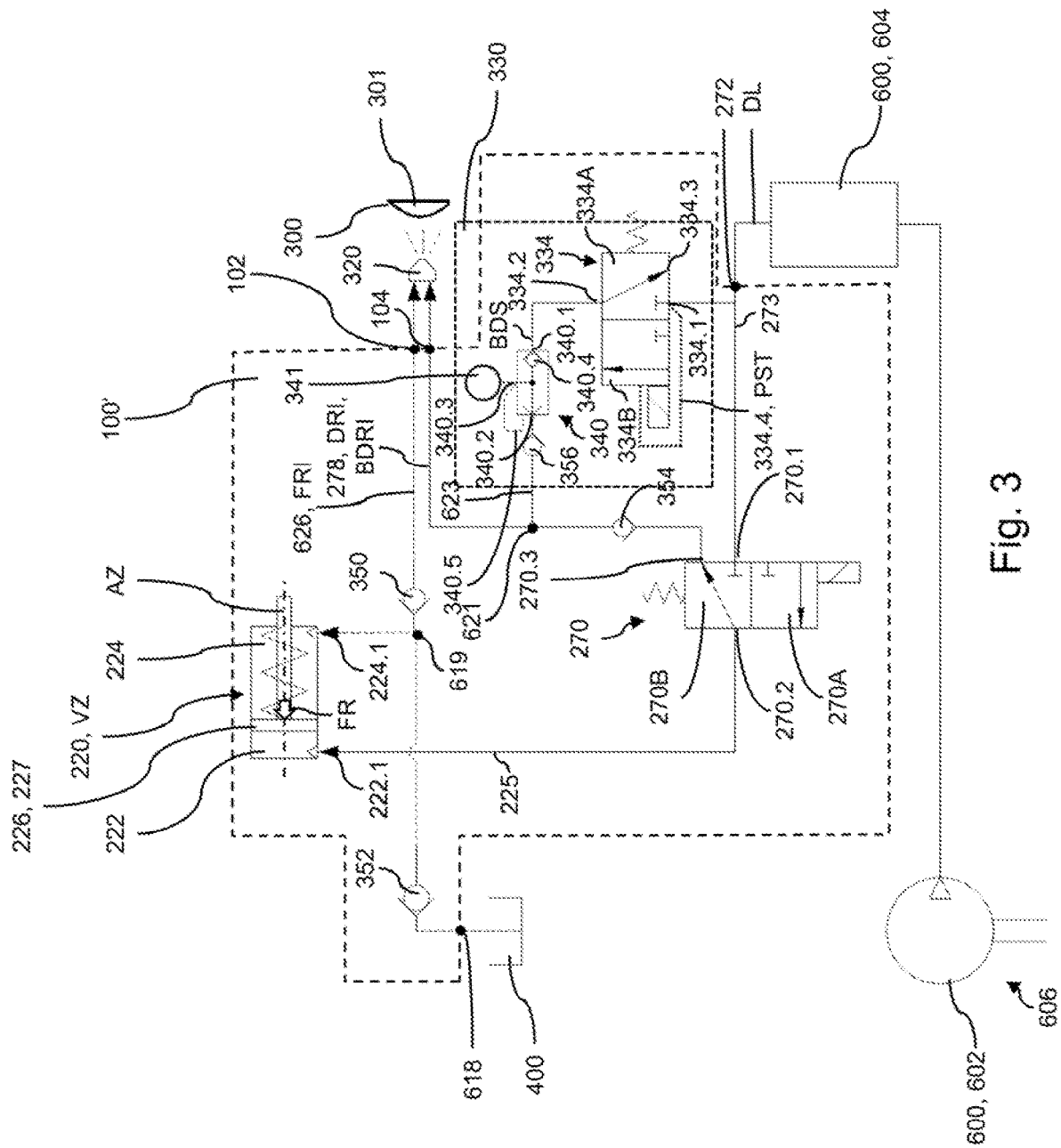
Figure 4:
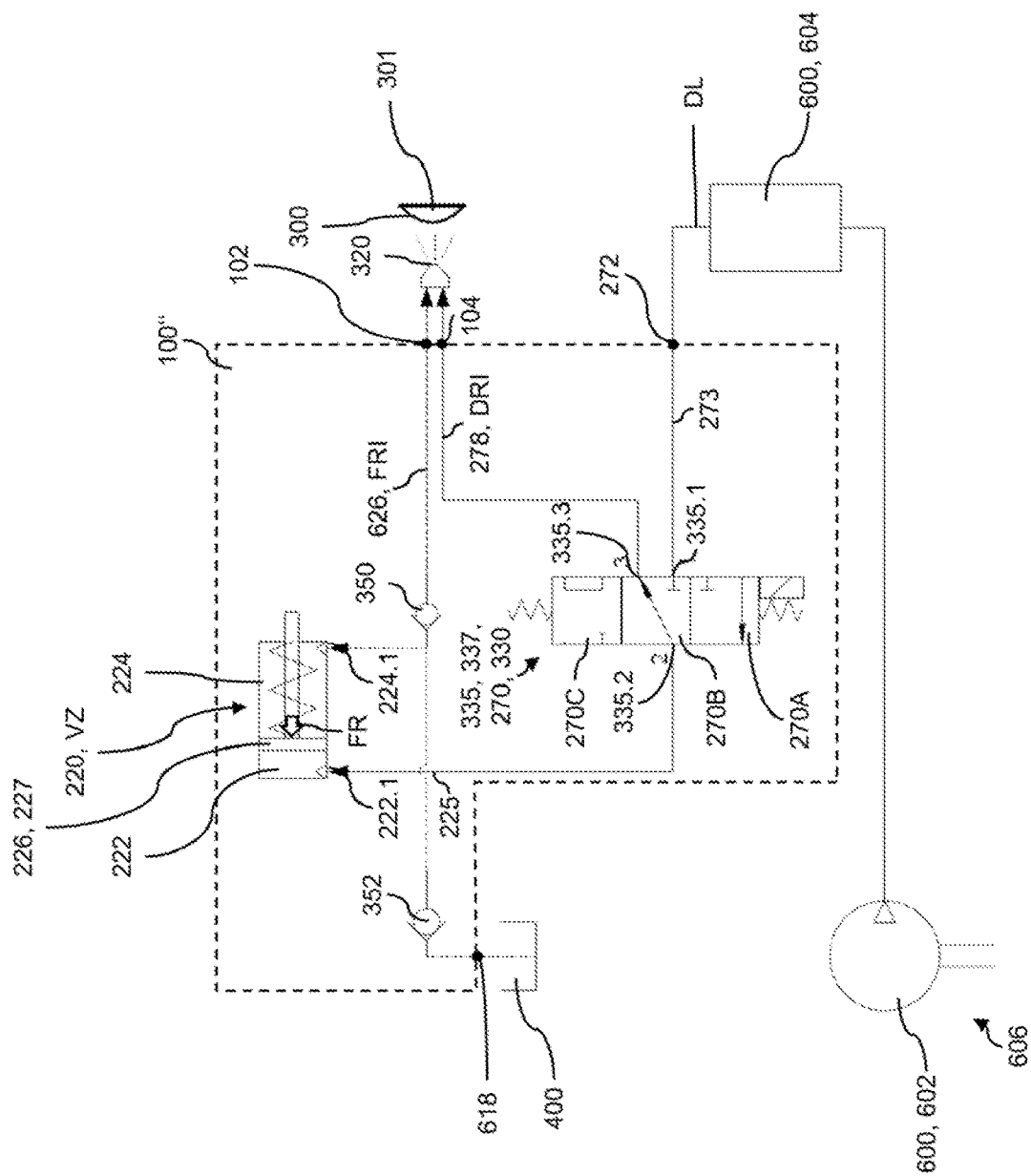
Figure 5:
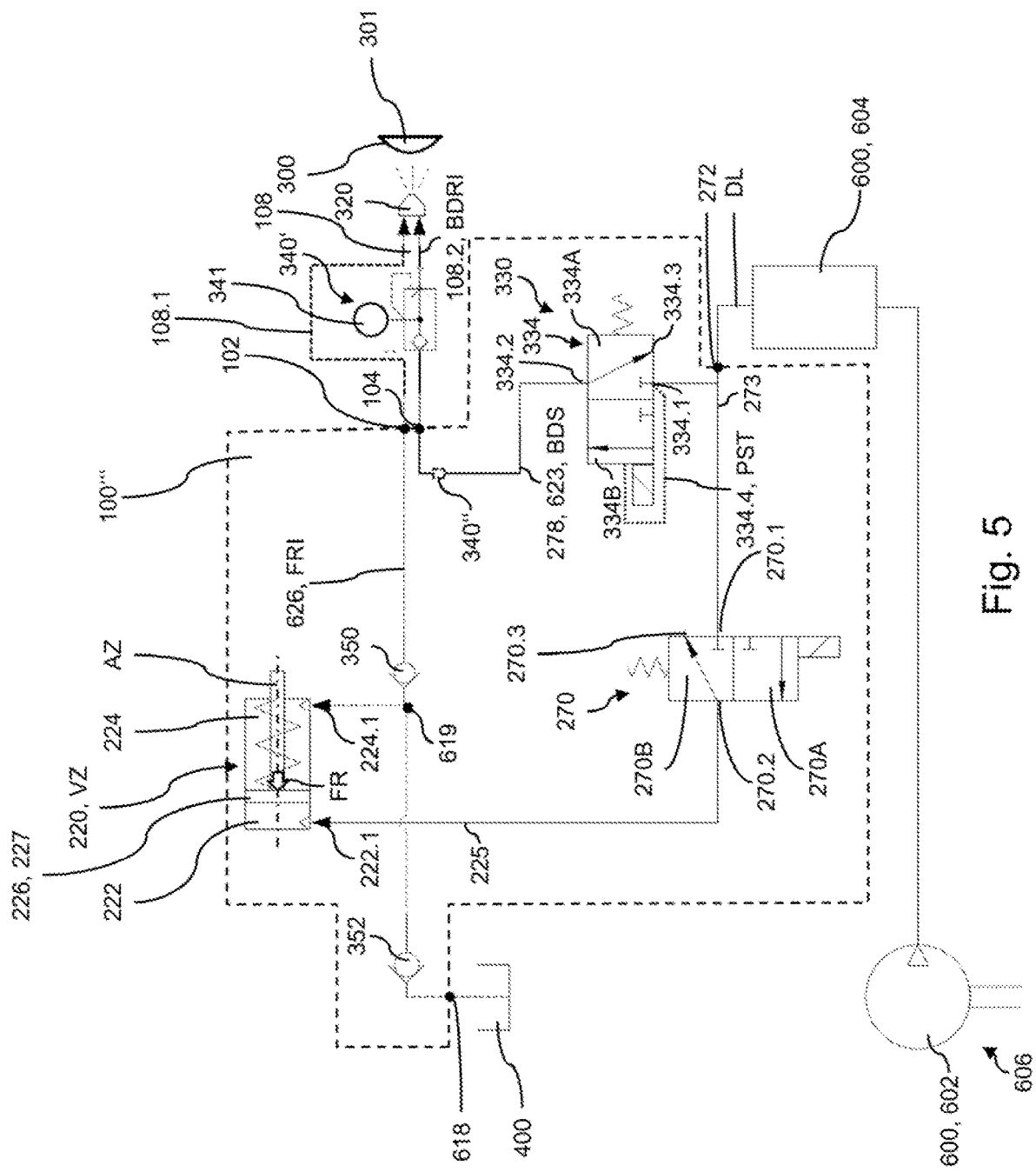
Figure 7A:
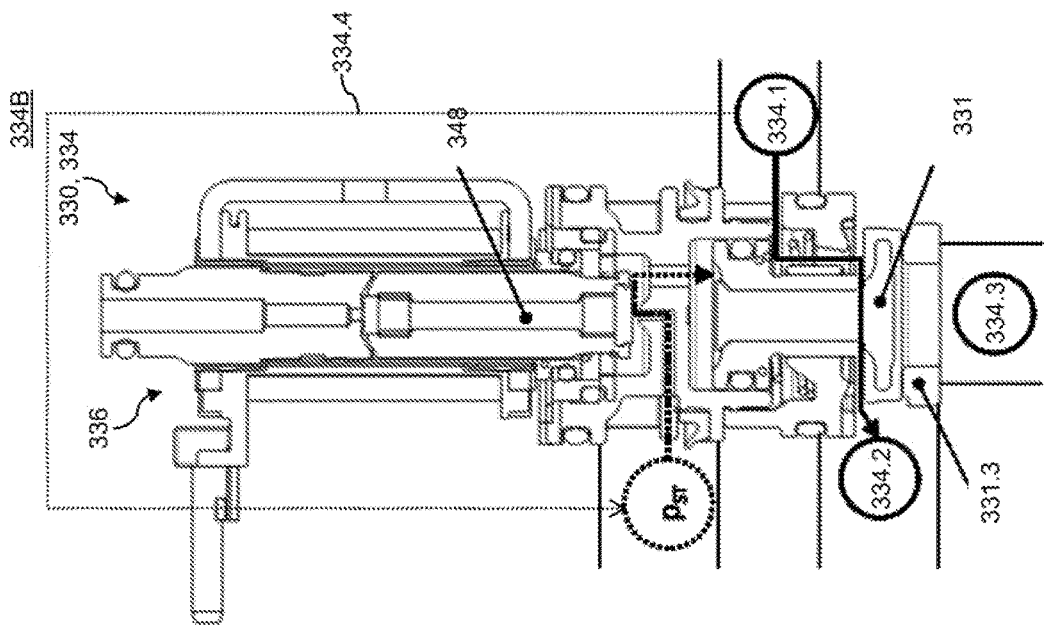
Figure 7B:
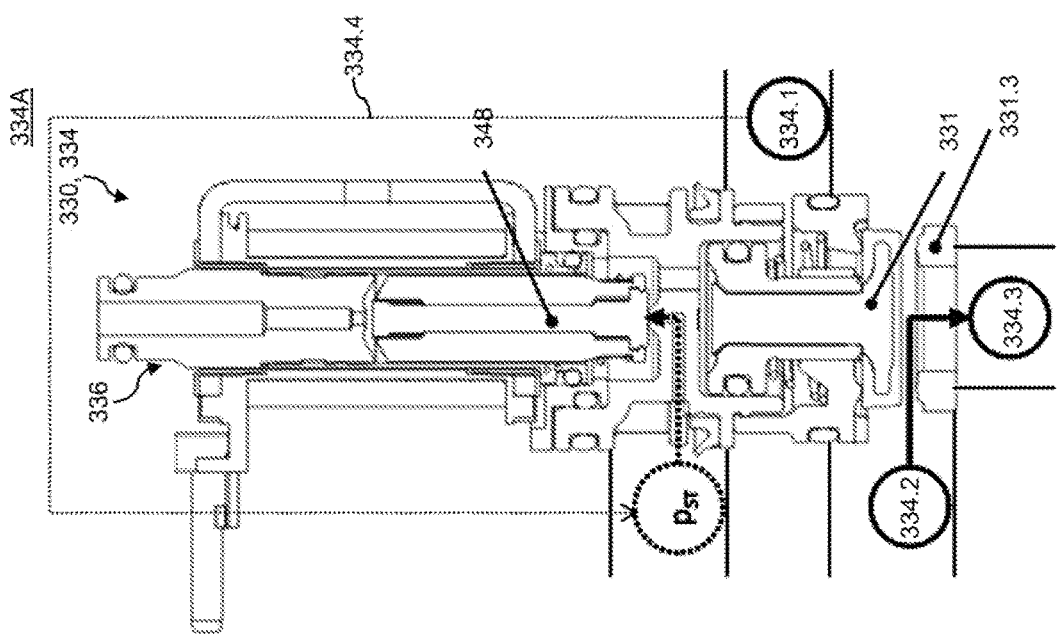
Figures 8A, 8B:
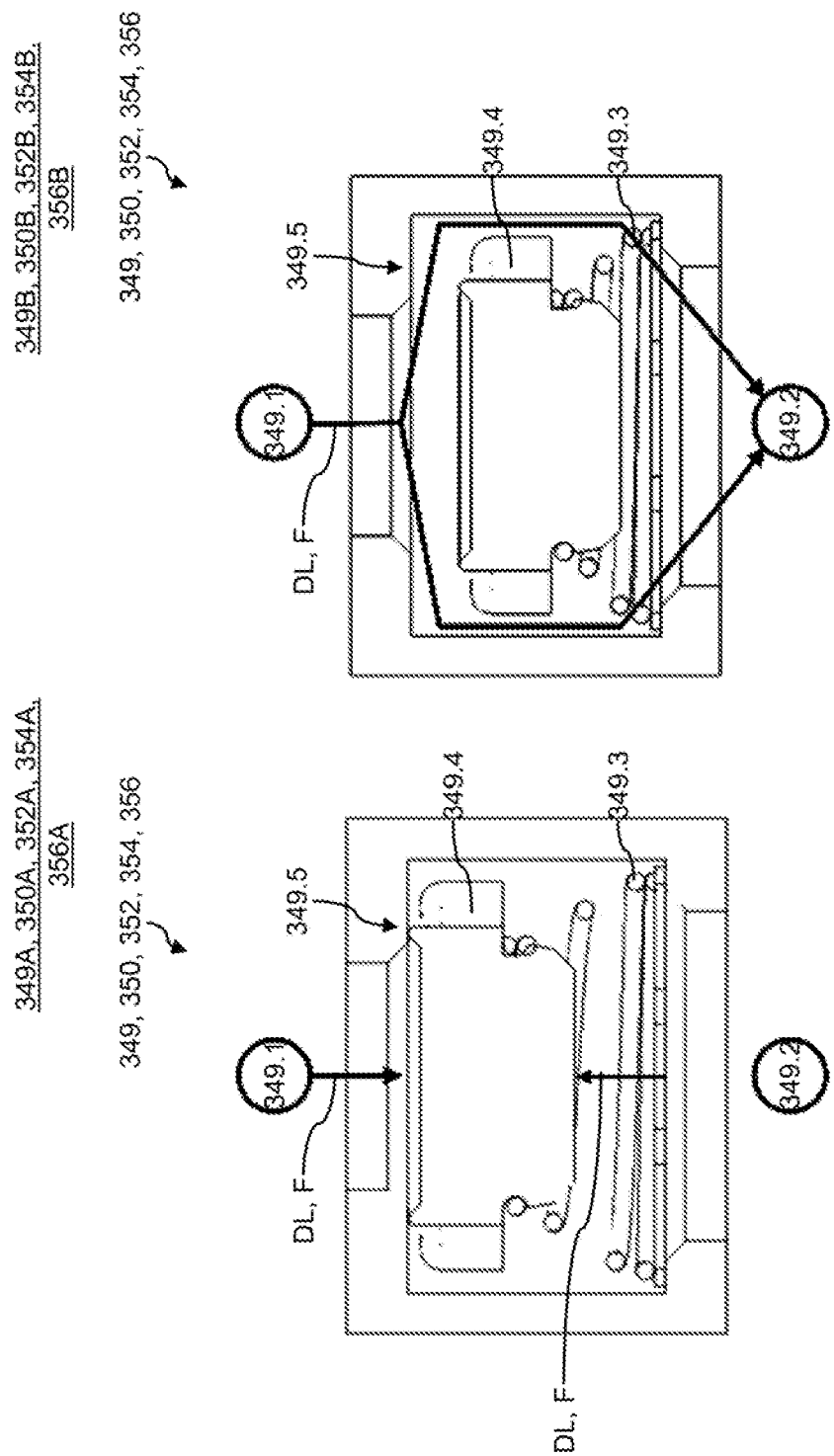
Figure 9:
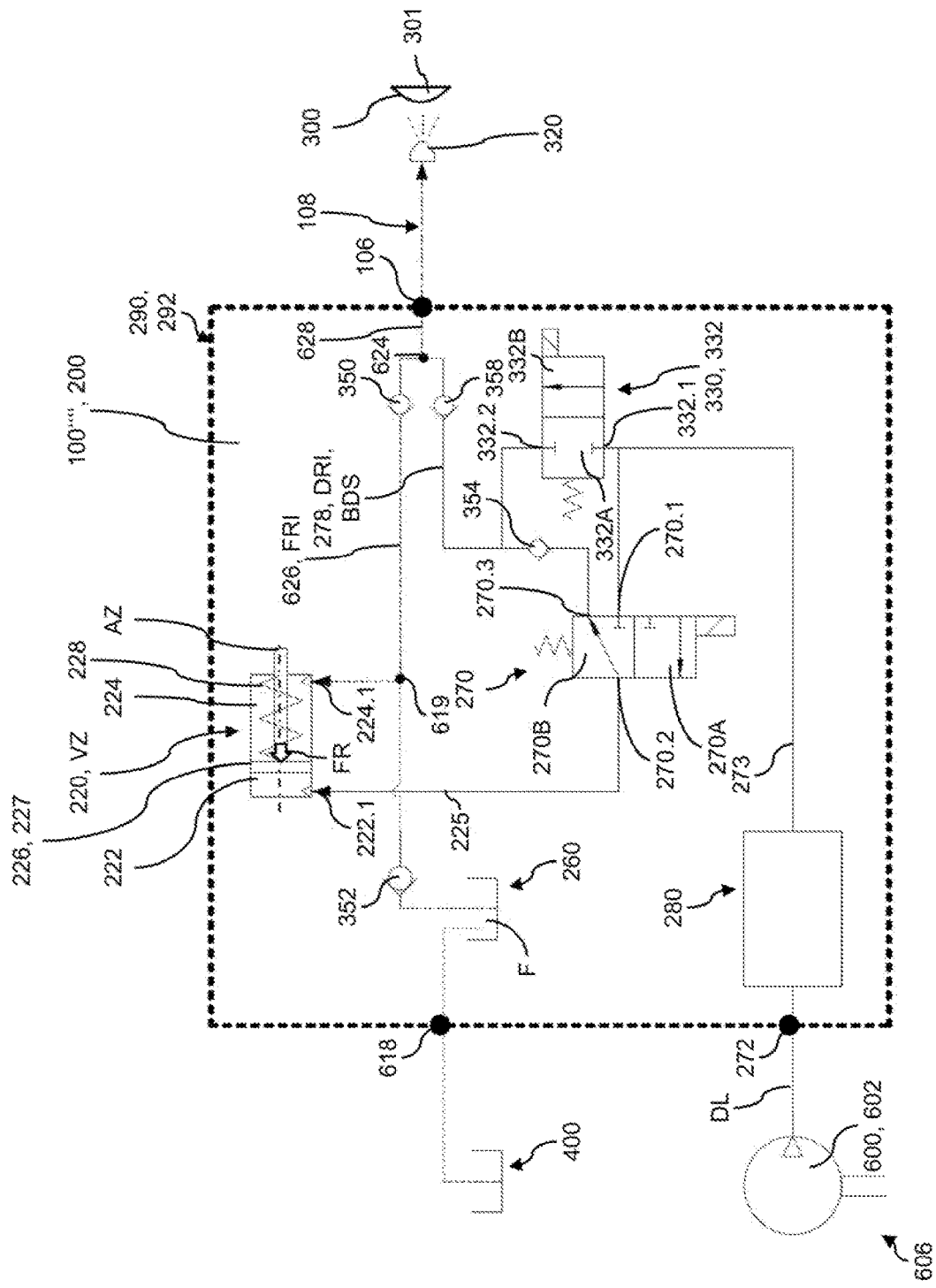
Figure 10:
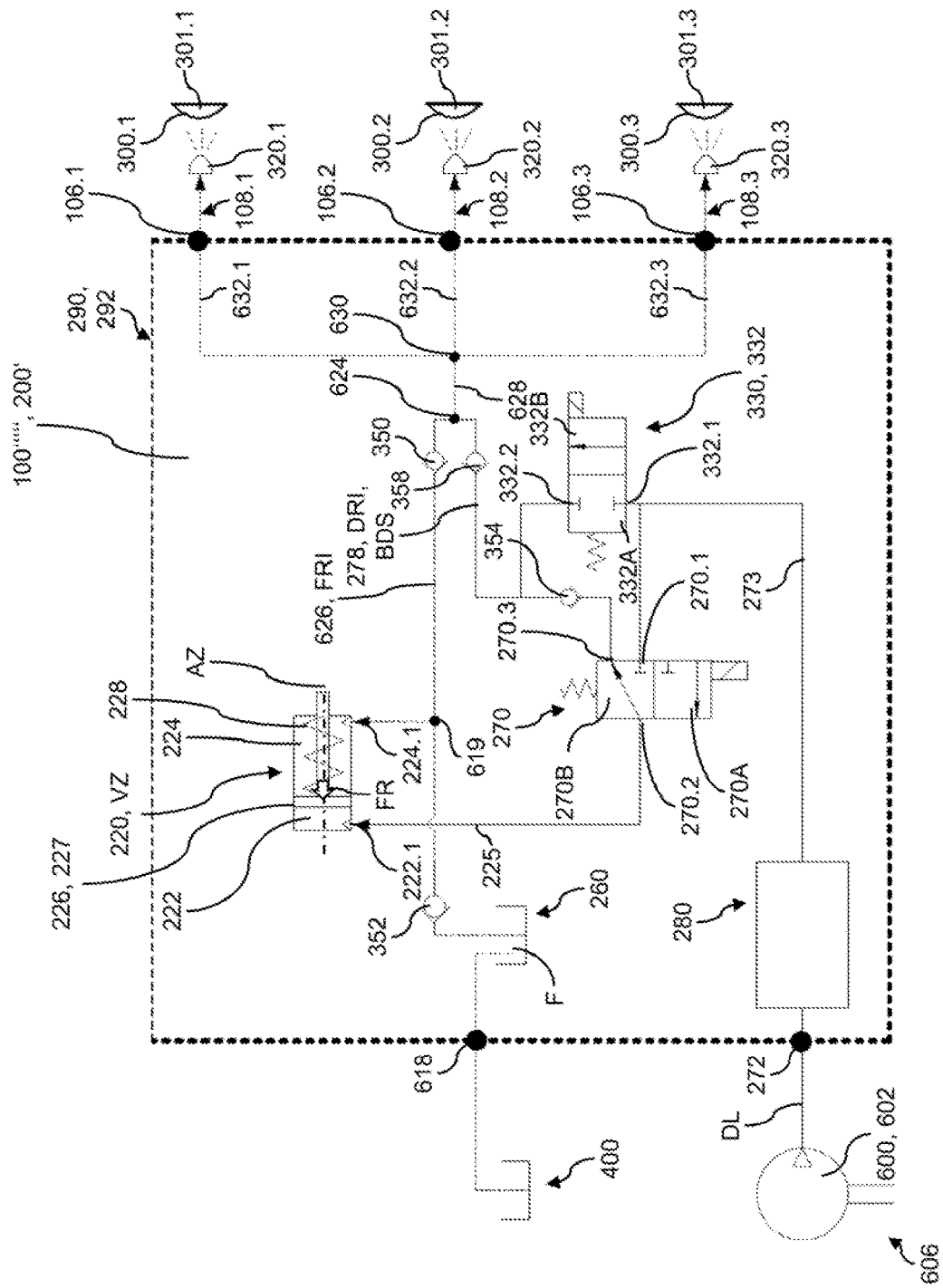
Figure 11:
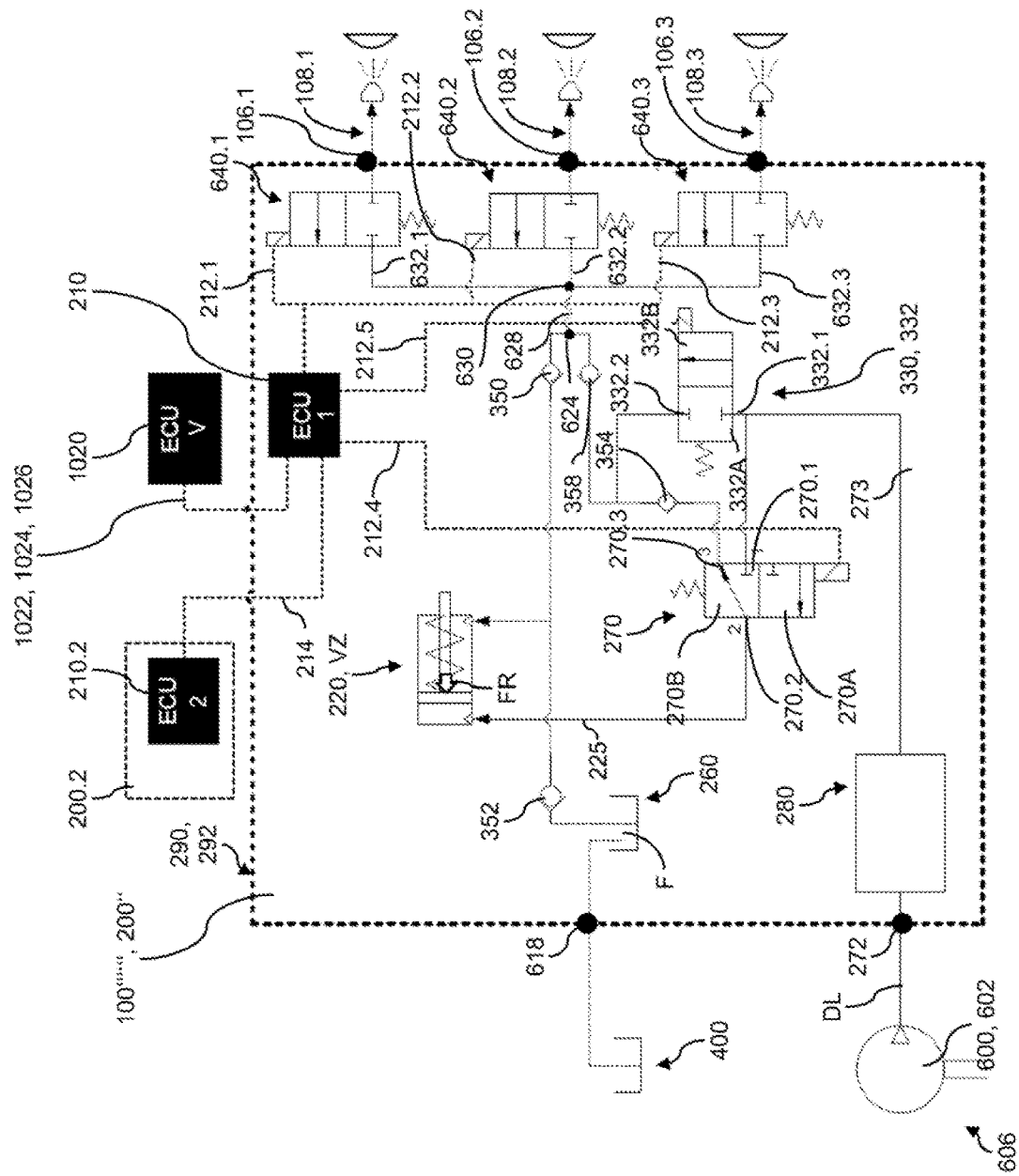
Figure 12:
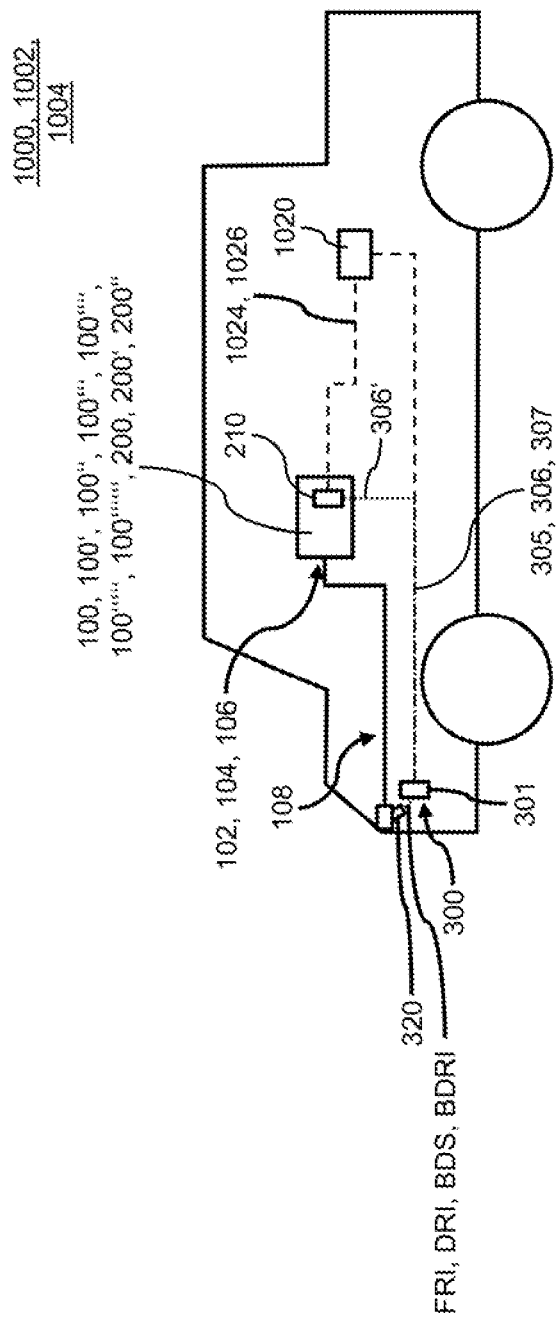

The invention will now be described with reference to the drawings wherein:
  FIG. 1 shows a cleaning device having a switching valve as disclosed in US 2022/0193734 A1, incorporated herein by reference;
  FIG. 2 shows a cleaning device according to a preferred first embodiment according to the concept of the disclosure;
  FIG. 3 shows a preferred further embodiment of a cleaning device according to the concept of the disclosure;
  FIG. 4 shows a preferred further embodiment of a cleaning device according to the concept of the disclosure;
  FIG. 5 shows a further preferred embodiment of a cleaning device according to the concept of the disclosure;
  FIGS. 6A, 6B show a preferred bypass valve in the form of 2/2-way valve in a sectional view;
  FIGS. 7A, 7B show a preferred bypass valve in the form of a 3/2-way valve;
  FIGS. 8A, 8B show a preferred non-return valve;
  FIG. 9 shows a preferred embodiment of a cleaning device in the form of a sensor cleaning module;
  FIG. 10 shows a further preferred embodiment of a cleaning device in a sensor cleaning module;
  FIG. 11 shows another further preferred embodiment of a cleaning device in a sensor cleaning module; and,
  FIG. 12 shows a vehicle with a cleaning device according to the concept of the disclosure.

DETAILED DESCRIPTION

FIG. 1 shows a cleaning device 99, which is configured for providing compressed air DL in the form of a compressed air cleaning pulse DRI to a nozzle compressed air connection 104 and for providing cleaning liquid F in the form of a liquid cleaning pulse FRI to a nozzle liquid connection 102. The cleaning device 99 has a module compressed air connection 272, which is configured for receiving compressed air DL from a compressed air source 600, in particular a compressor 602 and/or a pressure accumulator 604 of a compressed air supply system 606. The module compressed air connection 272 is pneumatically connected via a compressed air connection line 273 to a first connection 270.1 of a switching valve 270. The switching valve 270 is in the form of a 3/2-way solenoid valve in the present case.

The cleaning device 99 has a module liquid connection 618, which is configured for receiving cleaning liquid F from a liquid source 400.

The cleaning device 99 also has a pressure cylinder 220 with a separating arrangement or separator 226 in the form of a cylinder plunger 227 which is axially movable along a cylinder axis AZ and which divides a cylinder volume VZ of the pressure cylinder 220 variably into an air chamber 222 and a liquid chamber 224. The piston rod shown in the illustrated pressure cylinder is optional; in preferred embodiments, the pressure cylinder 220 may be configured without a piston rod, so that the cylinder plunger is only movably guided along the cylinder axis AZ by an inner wall of the pressure cylinder. The pressure cylinder 220 has an air chamber connection 222.1 in the area of the air chamber 222, via which the air chamber 222 can be supplied with compressed air DL to fill the air chamber 222. When the air chamber connection 222.1 is pressurized, the air chamber 222 expands by displacing the separating arrangement 226 against a restoring force FR, wherein the liquid chamber 224 contracts at the same time. In the present case, the separating arrangement 226 in the form of cylinder plunger 227 is held by a return spring 228 in the pressure cylinder 220, whereby the return spring 228 generates the restoring force FR when the cylinder plunger 227 is deflected. The air chamber connection 222.1 is pneumatically connected to a second connection 270.2 of the switching valve 270 via an air chamber line 225.

The pressure cylinder 220 has a liquid chamber connection 224.1 in the area of the liquid chamber 224, via which the liquid chamber 224 is fluidically connected to the liquid nozzle line 626. The liquid chamber connection 224.1 is fluidically connected to the liquid nozzle line 626 at a cylinder connection point 619. When the air chamber connection 222.1 is supplied with compressed air DL and the separating arrangement 226 is displaced against the restoring force FR, a quantity of cleaning liquid F held in the liquid chamber 224 is provided in the form of a liquid cleaning pulse FRI to the nozzle liquid connection 102 for a cleaning nozzle 320 via the liquid chamber connection 224.1 and via the cylinder connection point 619 and the liquid nozzle line 626. This is done by reducing the volume of the liquid chamber 224 by displacing the separating arrangement 226 and the cleaning liquid F is thus pushed out of the pressure cylinder 220, in particular in a pulsed manner.

The nozzle compressed air connection 104 is pneumatically connected via the compressed air nozzle line 278 to a third connection 270.3 of the switching valve 270. The switching valve 270 has in particular a relatively large nominal diameter for passing on the cleaning compressed air pulse to the compressed air nozzle line 278 advantageously without pressure loss or with as little pressure loss as possible. In particular, the switching valve 270 has a nominal diameter greater than or equal to the diameter of the compressed air nozzle line 278 and/or the air chamber line 225. It has been shown in the present case—but also generally regardless of the specific embodiment—that preferably the comparatively large nominal diameter of a switching valve 270 is in a range above 1.2 mm, in particular in a range from 1.0 mm to 3.0 mm; in general, nominal diameters of such or similarly implemented switching valves, such as that of the switching valve 270, have proven to be advantageous for passing an air pulse from the valve piston of the switching valve 270 as well as possible—for example also from the valve piston of a combination valve 335, which combines the function of the switching valve 270 and the bypass valve 330, or from the valve piston 331 of the bypass valve 330. In particular, such nominal diameters have proven to be advantageous for cleaning a camera sensor but are not limited to this.

An intake pressure non-return valve 350 is arranged in the liquid nozzle line 626 between the cylinder connection point 619 and the nozzle-liquid connection 102.

A liquid pulse non-return valve 352 is arranged in the liquid nozzle line 626 between the cylinder connection point 619 and the module liquid connection 618. The liquid pulse non-return valve 352 prevents cleaning liquid F from escaping towards the module liquid connection 618 when providing the liquid cleaning pulse FRI.

In a ventilation position 270A of the switching valve 270, the first connection 270.1 is pneumatically connected to the second connection 270.2 and the third connection 270.3 is blocked. In this ventilation position 270A, an air pressure applied to the module compressed air connection 272 is thus forwarded to the air chamber connection 222.1, which results in expansion of the air chamber 222 and the provision of a liquid cleaning pulse FRI to the nozzle liquid connection 102. Consequently, a sensor surface 300 is subjected to the liquid cleaning pulse FRI via the cleaning nozzle 320.

In a venting position 270B of the switching valve 270—as shown here—the second connection 270.2 is pneumatically connected to the third connection 270.3 and the first connection 270.1 is blocked. This venting position 270B results in venting of the air chamber connection 222.1, whereby the separating arrangement 226 moves back under the restoring force FR, and both the air chamber 222 contracts and the liquid chamber 224 expands. By moving the separating arrangement 226 back, a vacuum is created at the liquid chamber connection 224.1. Due to the intake pressure non-return valve 350, the vacuum acts only at the module liquid connection 618 (and not at the nozzle liquid connection 102), whereby new cleaning liquid F is drawn from the liquid source 400 into the liquid chamber 224, in particular without the need for a pump or a similar conveying device.

At the same time, the return movement of the separating arrangement 226 causes an overpressure at the air chamber connection 222.1, which results in a flow of compressed air DL to the nozzle compressed air connection 104 via the second connection 270.2 and the third connection 270.3, whereby a compressed air cleaning pulse DRI is provided at the nozzle compressed air connection 104. Consequently, the sensor surface 300 is pressurized with the compressed air cleaning pulse DRI via the cleaning nozzle 320 for cleaning.

The cleaning process is thus completed and can be repeated if necessary by switching the switching valve 270 back to the ventilation position 270A.

FIG. 2 shows a cleaning device 100 according to the disclosure, which, in contrast to the cleaning device 99 shown in FIG. 1, additionally has a bypass valve 330 and a compressed air pulse non-return valve 354. The bypass valve 330 is formed in the present case in the form of a 2/2-way valve 332, namely a 2/2-way solenoid valve 333. The 2/2-way valve 332 is pneumatically connected via a first connection 332.1 to the compressed air connection line 273, and via a second connection 332.2 and a bypass line 623 to a bypass connection point 621 of the compressed air nozzle line 278.

The compressed air pulse non-return valve 354 is arranged in the compressed air nozzle line 278 between the third connection 270.3 of the switching valve 270 and the bypass connection point 621.

In a closed position 332A of the 2/2-way valve 332 or the bypass valve 330 the first connection 332.1 is pneumatically separated from the second connection 332.2. In this closed position 332A, the operation of the cleaning device 100 is essentially the same as that of the cleaning device 99 described in FIG. 1. By switching the bypass valve 330, however, according to the concept of the disclosure the nozzle compressed air connection 104 can be supplied directly with compressed air DL from the module compressed air connection 272 while bypassing the switching valve 270. In the present case, this is done by switching the bypass valve 330 in the form of the 2/2-way valve 332 into an open position 332B, in which the first connection 332.1 is pneumatically connected to the second connection 332.2. As a result, the compressed air DL applied to the module compressed air connection 272 can be forwarded directly via the bypass connection point 621 and the compressed air nozzle line 278 to provide a bypass compressed air flow BDS to the nozzle compressed air connection 104. Subjecting the sensor surface 300 to compressed air DL through the bypass valve 330, in particular with a bypass compressed air flow BDS, can thus advantageously be enabled without actuating the pressure cylinder 220.

The compressed air pulse non-return valve 354 ensures that—if the 2/2-way valve 332 is in the open position 332B and the switching valve is in the venting position 270B—the compressed air DL cannot flow towards the switching valve 270 and thus into the air chamber 222 of the pressure cylinder 220.

Optionally, the 2/2-way valve 332 may have a control line 332.3 at the first connection 332.1 for providing a control pressure PST.

FIG. 3 shows a further preferred embodiment of a cleaning device 100' according to the concept of the disclosure, which in contrast to the cleaning device 100 shown in FIG. 2 has an arrangement of a 3/2-way valve 334 and additionally a quick exhaust valve 340 as a bypass valve 330. The quick exhaust valve 340 is arranged in the bypass line 623. Via the quick exhaust valve 340, a pulse-like bypass compressed air cleaning pulse BDRI can be advantageously generated on the basis of the bypass compressed air flow BDS, in particular in the form of a continuous flow, and provided at the nozzle compressed air connection 104.

The quick exhaust valve 340 has a first connection 340.1, which pneumatically connects the quick exhaust valve 340 to the second connection 334.2 of the 3/2-way valve 334. The quick exhaust valve 340 has a second connection 340.2, which pneumatically connects the quick exhaust valve 340 to the bypass connection point 621. The quick exhaust valve 340 also has a third connection 340.3, to which a compressed air buffer 341 of the quick exhaust valve 340 is pneumatically connected. The quick exhaust valve 340 is formed in the manner of a selection valve with a valve body 340.4, which of the first connection 340.1 and the second connection 340.2 blocks the connection to which the weaker air pressure is applied and connects the respective other connection pneumatically to the third connection 340.3.

Furthermore, a bypass non-return valve 356, which opens in a flow direction from the 3/2-way valve 334 to the bypass connection point 621 and blocks in the opposite direction, is arranged in the bypass line 623 between the second connection 334.2 of the 3/2-way valve 334 and the bypass connection point 621. In an open position 334B of the 3/2-way valve 334—analogous to the open position 332B of the 2/2-way valve 332 shown in FIG. 2—a first connection 334.1 of the 3/2-way valve 334 leading to the compressed air connection line 273 is pneumatically connected to the second connection 334.2. As a result, the compressed air DL applied to the module compressed air connection 272 in the form of the bypass compressed air flow BDS is forwarded to the first connection 340.1 of the quick exhaust valve 340, whereby the valve body 340.4 is pressed against the second connection 340.2 in a blocking manner and the compressed air buffer 341 is filled with compressed air DL via the third connection 340.3. If the 3/2-way valve 334 is now switched to a closed position 334A, the second connection 334.2 is pneumatically connected to a third connection 334.3, which vents in particular into the environment, and the first connection 334.1 is blocked. As a result, the air pressure at the first connection 340.1 of the quick exhaust valve drops to ambient pressure and the valve body 340.4 is pressed in a blocking manner against the first connection 340.1 by the pressure of the compressed air DL stored in the compressed air buffer 341, in particular via a quick exhaust valve control line 340.5. Consequently, the second connection 340.2 is opened, whereby the compressed air DL stored in the compressed air buffer 341 can be provided to the nozzle compressed air connection 104 in the form of the bypass compressed air cleaning pulse BDRI via the second connection 340.2 and further the bypass connection point 621 and the compressed air nozzle line 278. The compressed air pulse non-return valve 354 prevents the bypass compressed air cleaning pulse BDRI from flowing towards the switching valve 270.

By switching the 3/2-way valve 334 back to the open position 334B, the compressed air buffer 341 can be filled with compressed air DL again and the process for generating the bypass compressed air cleaning pulse BDRI can be repeated—if necessary and in particular as often as desired and independently of the pressure cylinder 220.

Regardless of the generation of a bypass compressed air flow BDS and/or a bypass compressed air cleaning pulse BDRI, the generation of a compressed air cleaning pulse DRI and/or a liquid cleaning pulse FRI can be carried out in the known manner via the pressure cylinder 220 and the switching valve 270—as described in connection with FIG. 1.

In the cleaning system 100' shown in FIG. 3, the bypass non-return valve 356 prevents a compressed air cleaning pulse DRI generated by the pressure cylinder 220, which is passed to the compressed air nozzle line 278 via the switching valve 270 in its venting position 270B, from reaching the quick exhaust valve 340.

Optionally, the 3/2-way valve 334 can have a control line 334.4 at the first connection 334.1 for providing a control pressure PST.

FIG. 4 shows a further embodiment of a cleaning device 100" according to the concept of the disclosure. The cleaning device 100" has a combination valve 335 in the form of a 3/3-way valve 337, which combines the functions of the switching valve 270 and the bypass valve 330. A first connection 335.1 of the combination valve 335 corresponds to the first connection 270.1 of the switching valve 270, a second connection 335.2 of the combination valve 335 corresponds to the second connection 270.2 of the switching valve 270 and a third connection 335.3 of the combination valve 335 corresponds to the third connection 270.3 of the switching valve 270, wherein the switching valve 270 is shown in FIG. 1 to FIG. 3.

The combination valve 335 differs from the switching valve 270 shown in FIGS. 1 to 3 in that it has a bypass position 270C—in addition to the ventilation position 270A and venting position 270B shown in FIG. 1 to FIG. 3. The bypass position 270C blocks the second connection 335.2 leading to the air chamber connection 222.1, and at the same time provides a pneumatic connection between the first connection 335.1 and the third connection 335.3 of the combination valve 335, whereby the module compressed air connection 272 is pneumatically connected to the nozzle compressed air connection 104 for providing the bypass compressed air flow BDS. The bypass position 270C thus essentially carries out the function of the bypass valve 330.

With the embodiment of the cleaning device 100" shown here, a compact configuration can be advantageously achieved by the combination of the switching valve 270 and the bypass valve 330 in a combination valve 335.

In general, with regard to the lowest possible pressure losses and thus the strongest possible bypass compressed air cleaning pulse BDRI, it is advantageous to keep the line length between the quick exhaust valve 340 and the cleaning nozzle as short as possible. In FIG. 5, a further preferred embodiment of a cleaning device 100''' is shown, in which—in particular with regard to the embodiment shown in FIG. 3—instead of the quick exhaust valve 340 shown in FIG. 3, a further quick exhaust valve 340' is arranged closer to the cleaning nozzle 320, namely between the compressed air nozzle connection 104 and the cleaning nozzle 320 in a compressed air nozzle connection line 108.2. The compressed air nozzle connection line 108.2 forms a nozzle connection line 108 together with a liquid nozzle connection line 102 connecting the liquid nozzle connection 102 to the cleaning nozzle 320. The cleaning nozzle 320, the nozzle connection line 108 and the quick exhaust valve 340 may be formed in particular as part of the cleaning device 100'''.

Furthermore, in the embodiment shown, the third connection 270.3 of the switching valve 270 is not connected to the compressed air nozzle line 278 but is configured to vent directly into the environment in the venting position 270B. Thus, in this embodiment, no compressed air cleaning pulse DRI generated by the pressure cylinder 220 is provided to the compressed air nozzle line 278, however, a constructive simplification of the cleaning device 100''' is advantageously achieved, in particular by the omission of the non-return valves 354, 356. The bypass line 623 and the compressed air nozzle line 278 coincide directly in this embodiment and are configured for guiding the bypass compressed air flow BDS from the bypass valve 330 to the compressed air nozzle connection 104.

In other embodiments, alternatively, a quick exhaust valve 340 can also be arranged in other places in the compressed air nozzle line 278 or the compressed air nozzle connection line 108.2, in particular to be provided as an alternative to the further quick exhaust valve 340' and shown highly simplified here as yet another quick exhaust valve 340'' in the compressed air nozzle line 278 near the compressed air nozzle connection 104.

FIG. 6A and FIG. 6B show a preferred bypass valve 330 in the form of a 2/2-way valve 332 in a sectional view. The embodiment shown here is a cartridge valve 336 in the form of a solenoid valve, which can be switched via a corresponding electrical control—and here optionally also via a control pressure PST. The cartridge valve 336 is configured in particular for installation in a valve cartridge housing 292, which can be used as a module housing 290 for a sensor cleaning module 200 (see FIG. 9, FIG. 10, FIG. 11).

The control pressure PST can be provided via a control pressure line 332.3 shown here schematically, wherein the control pressure line 332.3 is pneumatically connected in particular to the first connection 332.1 of the 2/2-way valve 332. In the closed position 332A shown in FIG. 6A, the first connection 332.1 and the second connection 332.2 of the 2/2-way valve 332 are pneumatically separated by a valve piston 331.

In an open position 332B shown in FIG. 6B the valve piston 331 is subjected to the control pressure PST by energizing a magnetic armature 348 and a resulting axial movement of the magnetic armature 348, which results in an axial movement of the valve piston 331 towards a valve seat 296 of the 2/2-way valve 332. As a result of the axial movement of the valve piston 331, the first connection 332.1 is pneumatically connected to the second connection 332.2. In a module housing 290 in the form of a valve cartridge housing 292, the valve seat 296 may be formed in particular as part of the valve cartridge housing 292, in particular as part of a valve insert for the valve cartridge housing 292.

In FIG. 7A and FIG. 7B, another preferred bypass valve 330 in the form of a 3/2-way valve 334 is shown. In particular, the 3/2-way valve 334 is, like the 2/2-way valve 332 shown in FIG. 6A and FIG. 6B, in the form of an in particular identical cartridge valve 336 and can be used as a 3/2-way valve 334 in the present case—by the additional use of a connection arranged in the valve seat 296 as a third connection 334.3.

In the closed position 334A of the 3/2-way valve 334 shown in FIG. 7A, the magnetic armature 348 is in its closed position, whereby the control pressure PST cannot act on the valve piston 331. In this closed position 334A, the first connection 334.1 is blocked and the second connection 334.2 is pneumatically connected to the third connection 334.3.

Analogous to the open position 332B of the 2/2-way valve 332 shown in FIG. 6B, in an open position 334B of the 3/2-way valve 334 shown in FIG. 7B the magnetic armature 348 is moved upwards by energization, whereby the control pressure PST can act on the valve piston 331 and moves it axially towards the valve seat 296. As a result, the third connection 334.3 is blocked and the first connection 334.1 is pneumatically connected to the second connection 334.2 of the 3/2-way valve 334.

In alternative embodiments, other types of valves known to those skilled in the art can also be used, for example, a direct-switching solenoid valve without the use of a control pressure. With a direct-switching solenoid valve, the valve piston is moved directly by the energization of a solenoid armature, which means that the valve piston does not need to be pressurized with a control pressure.

FIG. 8A and FIG. 8B show a preferred non-return valve 349, in particular an intake pressure non-return valve 350, a liquid pulse non-return valve 352, a compressed air pulse non-return valve 354 and/or a bypass non-return valve 356. In FIG. 8A, the non-return valve 349 is shown in a first, blocking position 349A, in which a flow of compressed air DL or cleaning liquid F cannot pass through the non-return valve. This is the case if the compressed air DL or cleaning liquid F is applied to a second connection 349.2 since it presses a valve body 349.4 against a valve seat 349.5 and thus a pneumatic and/or fluid-carrying connection between the second connection 349.2 and the first connection 349.1 is blocked.

The non-return valve also blocks when the compressed air DL and/or the cleaning liquid F is applied to the first connection 349.1 with a pressure that is too low to overcome a force of a valve spring 349.3, and the valve body 349.4 can therefore not be lifted off the valve seat 349.5.

FIG. 8B shows the non-return valve 349 in a second, open position 349B. In this open position 349B, a compressed air DL and/or a cleaning liquid F, the pressure of which is sufficiently high to overcome the force of the valve spring 349.3, is applied to the first connection 349.1, whereby the valve body 349.4 is lifted off the valve seat 349.5 and the compressed air and/or the cleaning liquid F can flow to the second connection 349.2.

FIG. 9 shows an embodiment of a cleaning device 100'''' which is formed as a sensor cleaning module 200, in particular enclosed in a module housing 290. The module housing 290 can be formed in particular as a valve cartridge housing 292. A valve cartridge housing 292 offers the advantage of a pneumatic or hydraulic standard component, which is known and available from other areas, such as axle modulators.

The present sensor cleaning module 200 can optionally have a module accumulator 260 for storing cleaning liquid F within the sensor cleaning module 200. The module accumulator 260 is fluidically connected to the liquid nozzle line 626, in particular between the module liquid connection 618 and the liquid pulse non-return valve 352. Via a module accumulator 260, cleaning liquid F can be stored decentrally in the sensor cleaning module 200 in addition or alternatively to a liquid source 400. In the configuration and arrangement of the module accumulator 260 shown here, the cleaning liquid F can be taken from the module accumulator 260 advantageously during the movement of the separating arrangement 226 already described above, in particular the cylinder plunger 227, in the pressure cylinder 220, and the resulting vacuum at the liquid chamber connection 224.1. In particular, apart from the pressure cylinder 220, the liquid pulse non-return valve 352 and the intake pressure non-return valve 350 shown, advantageously no further hydraulic or fluidic switching and/or conveying means are used for this purpose. Depending on the capacity of the optional module accumulator 260, this can advantageously reduce the dependence on a liquid source and/or can serve as an expansion tank, in particular to avoid air in the cleaning liquid carrying parts of the cleaning device.

The present sensor cleaning module 200 further has an optional module compressed air accumulator 280, which is configured for receiving compressed air DL provided at the module compressed air connection 272. The availability of compressed air DL in the sensor cleaning module 200 can be advantageously increased via a module compressed air accumulator 280. The module compressed air accumulator 280 is arranged in particular in the compressed air connection line 273, in particular between the module compressed air connection 272 and the bypass valve 330.

Furthermore, the sensor cleaning module 200 has a nozzle combination connection 106 for connecting a cleaning nozzle 320. The nozzle combination connection 106 is fluidically connected to a nozzle line junction 624. The nozzle line junction 624 for the liquid nozzle line 626 combines fluidically with the compressed air nozzle line 278 to form a combination nozzle line 628. A simplified module connection for a cleaning nozzle 320 having only one line connection is thus advantageously created by a nozzle combination connection 106. Nevertheless, the sensor cleaning module 200 in alternative embodiments, as shown in FIG. 2, FIG. 3, FIG. 4, may have a nozzle liquid connection 102 and a nozzle compressed air connection 104 in a separate manner.

Optionally, the sensor cleaning module 200 in the compressed air nozzle line 278 may additionally have a nozzle line non-return valve 358, which is configured to open in the direction of the compressed air cleaning pulse DRI and the bypass compressed air flow BDS (and, in embodiments with a quick exhaust valve 340, also in the direction of the bypass compressed air cleaning pulse BDRI), and to block in the opposite direction.

The embodiment of a cleaning device 100''' in a sensor cleaning module 200' shown in FIG. 10 differs from the embodiment of the sensor cleaning module 200 shown in FIG. 9 in that a nozzle line distribution point 630 is arranged in the combination nozzle line 628. The nozzle line distribution point 630 is fluidically connected to a first nozzle branch line 632.1 leading to a first nozzle combination connection 106.1, and to a second nozzle branch line 632.2 leading to a second nozzle combination connection 106.2, and to a third nozzle branch line 632.3 leading to a third nozzle combination connection 106.3. Nevertheless, embodiments are also possible with a larger or smaller number of nozzle branch lines 632 and correspondingly of nozzle combination connections 106. In the embodiment of the sensor cleaning module 200' shown here, advantageously multiple cleaning nozzles 320 can be connected to a sensor cleaning module 200', here a first cleaning nozzle 320.1 for cleaning a first sensor surface 300.1, a second cleaning nozzle 320.2 for cleaning a second sensor surface 300.2 and a third cleaning nozzle 320.3 for cleaning a third sensor surface 300.3.

The embodiment of a cleaning device 100'''' in a sensor cleaning module 200'' shown in FIG. 11 differs from the embodiment of the sensor cleaning module 200' shown in FIG. 10 in that a respective nozzle valve 640.1, 640.2, 640.3 is arranged in each nozzle branch line 632.1, 632.2, 632.3. In the present case, the nozzle valves are in the form of 2/2-way solenoid valves. Via one or more nozzle valves 640 it is advantageously possible to selectively activate or deactivate individual cleaning nozzles 320 when providing a liquid cleaning pulse FRI and/or a compressed air cleaning pulse DRI.

Furthermore, in FIG. 11 a module control unit 210 for controlling valves of the sensor cleaning module 200'', in particular the switching valve 270 and the bypass valve 330, is shown here as an example. The module control unit 210 is in particular connected for signal transfer to a vehicle control unit 1020 via a vehicle control line 1024, which is in particular in the form of a vehicle bus 1026, for exchanging control signals 1022. The module control unit 210 is connected to the switching valve 270 via a switching valve control line 212.4. The module control unit 210 is connected to the bypass valve 330 via a bypass valve control line 212.5. The module control unit 210 can be connected via a module communication line 214 to further module control units 210.2 of further sensor cleaning modules 200.2 for signal transfer.

Each of the embodiments of a cleaning device 100, 100', 100'', 100''', 100'''', 100''''' and/or a sensor cleaning module 200, 200', 200'' presented here in the context of the disclosure may have such a module control unit 210.

In the present case of the embodiment shown in FIG. 11, the module control unit 210 is additionally connected for signal transfer via a first nozzle valve control line 212.1 to the first nozzle valve 640.1, and via a second nozzle valve control line 212.2 for signal transfer to the second nozzle valve 640.2, and via a third nozzle valve control line 212.3 for signal transfer to the third nozzle valve 640.3.

In FIG. 9, FIG. 10 and FIG. 11, by way of example the integration of a cleaning device 100 according to the concept of the disclosure is shown here based on the embodiment shown in FIG. 2 with a bypass valve 330 in the form of a 2/2-way valve 332, in particular of a 2/2-way solenoid valve 333. Nevertheless, it is possible to use other cleaning devices 100, 100', 100'' according to the concept of the disclosure having a bypass valve 330, in particular the embodiments shown in FIG. 2, FIG. 3 and FIG. 4, in the form of one of the sensor cleaning modules 200, 200' 200'' shown here within the scope of the disclosure.

FIG. 12 shows a schematic representation of a vehicle 1000, in particular a car 1002 or commercial vehicle 1004—in the present case in the form of an autonomous or semi-autonomous vehicle—having a cleaning device 100, 100'', 100''', 100'''', 100''''', 100'''''' for a sensor 301 in the form of an optical sensor, for example of a camera. Nevertheless, the cleaning device 100 can be used in other vehicles.

The cleaning device 100, 100", 100''', 100'''', 100''''', 100'''''', is in particular in the form of a sensor cleaning module 200, 200', 200". The cleaning device 100 has a module control unit 210, which is connected for signal transfer to a vehicle control unit 1020 via a vehicle control line 1024. The vehicle control line 1024 is in particular in the form of a vehicle bus 1026, in particular a CAN bus.

The sensor 301 is connected to the vehicle control unit 1020 for signal transfer via a sensor line 306 for the transmission of sensor signals 305. In particular, a cleaning check signal 307 for determining whether cleaning of the sensor surface 300 has taken place, in particular whether a liquid cleaning pulse FRI was emitted, can be transmitted to the vehicle control unit 1020 via the sensor line 306. A cleaning check signal 307 can be generated in a sensor 301 in the form of a camera, in particular via image processing, for example by detecting an improvement in the signal quality of the sensor signal or liquid particles in the camera image. In embodiments, alternatively or additionally, a sensor line 306' between the sensor 301 and the module control unit 210 may be provided, in particular for transmitting the cleaning check signal 307.

The cleaning nozzle 320 is configured for subjecting the sensor surface 300 to a liquid cleaning pulse FRI and/or a compressed air cleaning pulse and/or a bypass compressed air flow BDS and/or a bypass compressed air cleaning pulse BDRI. The cleaning nozzle 320 is fluidically connected to the cleaning device 100 via a nozzle liquid connection 102 and/or a nozzle compressed air connection 104 and/or a nozzle combination connection 106. In embodiments in which the cleaning nozzle 320 is not arranged directly on the cleaning device 100 or the sensor cleaning module 200, the cleaning nozzle 320 can be fluidically connected to the nozzle liquid connection 102 and/or the nozzle compressed air connection 104 and/or the nozzle combination connection 106 via a nozzle connection line 108.

It is understood that the foregoing description is that of the preferred embodiments of the invention and that various changes and modifications may be made thereto without departing from the spirit and scope of the invention as defined in the appended claims.

REFERENCE CHARACTER LIST (PART OF THE DESCRIPTION)

99 cleaning device
100, 100', 100", 100''', 100'''', 100''''', 100'''''' cleaning device
102 nozzle liquid connection
104 nozzle compressed air connection
106 nozzle combination connection
106.1-3 first to third nozzle combination connections
108 nozzle connection line
108.1 liquid nozzle connection line
108.2 compressed air nozzle connection line
200, 200', 200" sensor cleaning module
200.2 additional sensor cleaning module
210 module control unit
210.2 additional module control unit
212.1-3 first to third nozzle valve control lines
212.4 switching valve control line
212.5 bypass valve control line
214 module communication line
220 pressure cylinder
222 air chamber
222.1 air chamber connection
224 liquid chamber
224.1 liquid chamber connection
225 air chamber line
226 separating arrangement
227 cylinder plunger
228 return spring
260 module accumulator
270 switching valve
270A ventilation position of the switching valve
270B venting position of the switching valve
270C bypass position of the combination valve
272 module compressed air connection
273 compressed air connection line
278 compressed air nozzle line
280 module compressed air accumulator
290 module housing
292 valve cartridge housing
296 valve seat
300 sensor surface
300.1-3 first to third sensor surfaces
301 sensor
305 sensor signal
306 sensor line
307 cleaning check signal
318 media junction
320 cleaning nozzle
320.1-3 first to third cleaning nozzles
330 bypass valve
331 valve piston
332 2/2-way valve
332A closed position of the 2/2-way valve
332B open position of the 2/2-way valve
332.1 first connection of the 2/2-way valve
332.2 second connection of the 2/2-way valve
332.3 control pressure line of the 2/2-way valve
333 2/2-way solenoid valve
334 3/2-way valve
334A closed position of the 3/2-way valve
334B open position of the 3/2-way valve
334.1 first connection of the 3/2-way valve
334.2 second connection of the 3/2-way valve
334.3 venting connection of the 3/2-way valve
334.4 control pressure line of the 3/2-way valve
335 combination valve
336 cartridge valve
337 3/3-way valve
340 quick exhaust valve
340.1 first connection of the quick exhaust valve
340.2 second connection of the quick exhaust valve
340.3 third connection of the quick exhaust valve
340.4 valve body
340.5 quick exhaust valve control line
340' additional quick exhaust valve
340" another additional quick exhaust valve
341 compressed air buffer
348 magnetic armature
349 non-return valve
349.1 first connection of the non-return valve
349.2 second connection of the non-return valve
349.3 valve spring of the non-return valve
349.4 valve body of the non-return valve
349.5 valve seat of the non-return valve
350 intake pressure non-return valve
352 liquid pulse non-return valve
354 compressed air pulse non-return valve
356 bypass non-return valve
358 nozzle line non-return valve
400 liquid source 600 compressed air source
602 compressor
604 central compressed air accumulator
606 compressed air supply system
618 module liquid connection
619 cylinder connection point
620 liquid supply line
621 bypass connection point
623 bypass line
624 nozzle line junction
626 liquid nozzle line
628 combination nozzle line
630 nozzle line distribution point
632 nozzle branch line
632.1-3 first to third nozzle branch lines
640 nozzle valve
640.1-3 first to third nozzle valves
1000 vehicle
1002 passenger car
1004 commercial vehicle
1020 vehicle control unit
1022 control signal
1024 vehicle control line
1026 vehicle bus
AZ cylinder axis of the pressure cylinder
BDS bypass compressed air flow
BDRI bypass compressed air cleaning pulse
DL compressed air
DRI compressed air cleaning pulse
DSS compressed air control signal
F cleaning liquid
FRI liquid cleaning pulse
PST control pressure
VZ cylinder volume

The invention claimed is:

1. A cleaning device for a vehicle for providing at least one of the following:
   i) a liquid cleaning pulse; and,
   ii) a compressed air cleaning pulse for at least one cleaning nozzle, the cleaning device comprising:
   a module compressed air connection for receiving compressed air;
   a pressure cylinder defining a cylinder volume;
   a movable separator partitioning said cylinder volume into a compressed air receiving chamber and a cleaning liquid receiving chamber in a fluid-tight manner;
   said compressed air receiving chamber having an air chamber connection subjectable to compressed air for filling said compressed air receiving chamber;
   said separator being movable against a restoring force to contract said cleaning liquid receiving chamber and to expand said compressed air receiving chamber whereby cleaning liquid in a form of the liquid cleaning pulse is provided to a liquid nozzle line via a liquid chamber connection of said cleaning liquid receiving chamber;
   a switching valve configured to establish a pneumatic connection between said module compressed air connection and said air chamber connection in a ventilation position; and,
   a bypass valve configured to establish a pneumatic connection between said module compressed air connection and a compressed air nozzle line while bypassing said switching valve in an open position for providing a bypass compressed air flow.

2. The cleaning device of claim 1, wherein said bypass valve is in a form of one of the following: a 2/2-way valve; a 2/2-way solenoid valve; and, a cartridge valve.

3. The cleaning device of claim 1, wherein:
   said bypass valve is configured as an arrangement of a 3/2-way valve and a quick exhaust valve;
   said 3/2-way valve is configured to establish a pneumatic connection between said module compressed air connection and said quick exhaust valve in an open position and to establish a pneumatic connection between said quick exhaust valve and a venting connection of said 3/2-way valve in a closed position; and,
   said quick exhaust valve is arranged in accordance with one of the following:
   i) between said bypass valve and said compressed air nozzle line; or,
   ii) in a compressed air nozzle connection line pneumatically connecting said cleaning nozzle to said cleaning device and being configured to receive said bypass compressed air flow and for providing a bypass compressed air cleaning pulse.

4. The cleaning device of claim 1, wherein:
   said switching valve and said bypass valve are configured as a combination valve, wherein said combination valve is in a form of a 3/3-way valve.

5. The cleaning device of claim 1, further comprising at least one of the following:
   i) a module accumulator for storing the cleaning liquid;
   ii) a module control unit configured to control at least one of the following: said switching valve and said bypass valve; and,
   iii) a module compressed air accumulator configured to store the compressed air.

6. The cleaning device of claim 1, further comprising:
   a nozzle line junction configured to fluidically connect said liquid nozzle line and the compressed air nozzle line to a combination nozzle line.

7. The cleaning device of claim 6, further comprising:
   a nozzle line distribution point configured to divide at least one of the following into multiple nozzle branch lines: said combination nozzle line; said liquid nozzle line;
   and, said compressed air nozzle line.

8. The cleaning device of claim 6, further comprising:
   a nozzle valve arranged in at least one of said combination nozzle line and a nozzle branch line.

9. The cleaning device of claim 8 further comprising:
   said at least one cleaning nozzle for subjecting a sensor surface to at least one of said liquid cleaning pulse and said compressed air cleaning pulse; and,
   said at least one cleaning nozzle being fluidically connected to at least one of the following: said compressed air nozzle line; said liquid nozzle line; said combination nozzle line; and, a nozzle branch line.

10. The cleaning device of claim 1, wherein:
    said pressure cylinder has a cylinder inner wall and defines a cylinder axis (AZ);
    said separator includes a cylinder plunger axially movable along the cylinder axis (AZ) and contacting said cylinder inner wall in a sealing manner; and,
    said cylinder plunger is held in said pressure cylinder via a return spring for generating the restoring force.

11. The cleaning device of claim 1, further comprising:
    a module control unit being configured for controlling at least one of the valves of said cleaning device including at least one of the following: said switching valve, said bypass valve and a nozzle valve; and/or, said module control unit being configured to communicate between said cleaning device and a vehicle control unit of the vehicle including via a vehicle bus.

12. A sensor cleaning module comprising:
a module housing; and, a cleaning device for providing at least one of the following:
i) a liquid cleaning pulse; and,
ii) a compressed air cleaning pulse for at least one cleaning nozzle; the cleaning device including:
a module compressed air connection for receiving compressed air;
a pressure cylinder defining a cylinder volume;
a movable separator partitioning said cylinder volume into a compressed air receiving chamber and a cleaning liquid receiving chamber in a fluid-tight manner;
said compressed air receiving chamber having an air chamber connection subjectable to compressed air for filling said compressed air receiving chamber;
said separator being movable against a restoring force to contract said cleaning liquid receiving chamber and to expand said compressed air receiving chamber whereby cleaning liquid in a form of the liquid cleaning pulse is provided to a liquid nozzle line via a liquid chamber connection of said cleaning liquid receiving chamber;
a switching valve configured to establish a pneumatic connection between said module compressed air connection and said air chamber connection in a ventilation position; and,
a bypass valve configured to establish a pneumatic connection between said module compressed air connection and a compressed air nozzle line while bypassing said switching valve in an open position for providing a bypass compressed air flow.

13. The sensor cleaning module of claim 12, wherein said module housing is a valve cartridge housing.

14. A vehicle comprising the cleaning device according to claim 1.

15. A method for operating a cleaning device for a vehicle for providing at least one of the following: i) a liquid cleaning pulse; and, ii) a compressed air cleaning pulse for at least one cleaning nozzle, the cleaning device including: a module compressed air connection for receiving compressed air; a pressure cylinder defining a cylinder volume; a movable separator partitioning said cylinder volume into a compressed air receiving chamber and a cleaning liquid receiving chamber in a fluid-tight manner; said compressed air receiving chamber having an air chamber connection subjectable to compressed air for filling said compressed air receiving chamber; said separator being movable against a restoring force to contract said cleaning liquid receiving chamber and to expand said compressed air receiving chamber whereby cleaning liquid in a form of the liquid cleaning pulse is provided to a liquid nozzle line via a liquid chamber connection of said cleaning liquid receiving chamber; a switching valve configured to establish a pneumatic connection between said module compressed air connection and said air chamber connection in a ventilation position; and, a bypass valve configured to establish a pneumatic connection between said module compressed air connection and a compressed air nozzle line while bypassing said switching valve in an open position for providing a bypass compressed air flow; the method comprising the steps of:
switching the switching valve to a ventilation position for supplying the air chamber connection for providing the liquid cleaning pulse to the liquid nozzle line;
switching the switching valve to the ventilation position for venting the air chamber connection; and,
moving the separator back via the restoring force for providing the compressed air cleaning pulse to the compressed air nozzle line and for refilling the liquid chamber with cleaning liquid.

16. The method of claim 15, further comprising the steps of:
checking on the basis of a cleaning check signal of the sensor whether cleaning of the sensor surface has taken place including whether the liquid cleaning pulse has been delivered to the sensor surface;
providing a negative cleaning check signal if no cleaning of the sensor surface has been carried out including if no liquid cleaning pulse has been delivered to the sensor surface; and,
repeating one or more of the method steps according to claim 15 if the cleaning check signal is negative.

17. The method of claim 15, further comprising the steps of:
switching the bypass valve to an open position for generating a bypass compressed air flow; and,
switching the bypass valve to a closed position including for generating a bypass compressed air cleaning pulse.

* * * * *

UNITED STATES PATENT AND TRADEMARK OFFICE
CERTIFICATE OF CORRECTION

PATENT NO. : 12,145,544 B2
APPLICATION NO. : 18/062994
DATED : November 19, 2024
INVENTOR(S) : Cohrs et al.

It is certified that error appears in the above-identified patent and that said Letters Patent is hereby corrected as shown below:

In the Specification

In Column 8:
Line 11: delete "BRIE" and insert -- BRIEF --

In Column 11:
Line 50: delete "3346" and insert -- 334B --
Line 51: delete "3326" and insert -- 332B --

In Column 13:
Line 58: delete "3326" and insert -- 332B --

In Column 14:
Line 18: delete "3326" and insert -- 332B --
Line 19: delete "3346" and insert -- 334B --

In Column 17:
Line 2: delete "100"""" and insert -- 100""" --

Signed and Sealed this
Twenty-fourth Day of June, 2025

Coke Morgan Stewart
*Acting Director of the United States Patent and Trademark Office*